United States Patent
Erlandson et al.

(10) Patent No.: US 11,296,478 B2
(45) Date of Patent: Apr. 5, 2022

(54) SCALING HIGH-ENERGY PULSED SOLID-STATE LASERS TO HIGH AVERAGE POWER

(71) Applicant: Lawrence Livermore National Security, LLC, Livermore, CA (US)

(72) Inventors: Alvin C Erlandson, Livermore, CA (US); Andrew J Bayramian, Livermore, CA (US); Constantin L Haefner, Livermore, CA (US); Craig W Siders, Livermore, CA (US); Thomas C Galvin, Livermore, CA (US); Thomas M Spinka, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 215 days.

(21) Appl. No.: 16/678,063

(22) Filed: Nov. 8, 2019

(65) Prior Publication Data
US 2020/0076150 A1    Mar. 5, 2020

Related U.S. Application Data

(63) Continuation-in-part of application No. PCT/US2018/031435, filed on May 7, 2018.
(Continued)

(51) Int. Cl.
*H01S 3/00*    (2006.01)
*H01S 3/042*    (2006.01)
(Continued)

(52) U.S. Cl.
CPC ............ *H01S 3/042* (2013.01); *H01S 3/0404* (2013.01); *H01S 3/091* (2013.01); *H01S 3/1001* (2019.08);
(Continued)

(58) Field of Classification Search
None
See application file for complete search history.

(56) References Cited

U.S. PATENT DOCUMENTS 4,076,541 A * 2/1978 Rapp ............. C03C 3/17
  252/301.4 P
5,239,408 A * 8/1993 Hackel ............. H01S 3/2341
  359/338
(Continued)

FOREIGN PATENT DOCUMENTS

CN    101752779 A * 6/2010 ............ H01S 3/06
EP    1084527 B1    3/2002
(Continued)

OTHER PUBLICATIONS

International Search Report and Written Opinion for PCT/US2018/031435 corresponding to U.S. Appl. No. 16/678,063, 11 pages.
(Continued)

*Primary Examiner* — Mark Hellner
(74) *Attorney, Agent, or Firm* — Ladas & Parry, LLP

(57) ABSTRACT

Techniques are provided for scaling the average power of high-energy solid-state lasers to high values of average output power while maintaining high efficiency. An exemplary technique combines a gas-cooled-slab amplifier architecture with a pattern of amplifier pumping and extraction in which pumping is continuous and in which only a small fraction of the energy stored in the amplifier is extracted on any one pulse. Efficient operation is achieved by propagating many pulses through the amplifier during each period equal to the fluorescence decay time of the gain medium, so that the preponderance of the energy cycled through the upper laser level decays through extraction by the amplified pulses rather than through fluorescence decay.

22 Claims, 17 Drawing Sheets

Related U.S. Application Data

(60) Provisional application No. 62/503,265, filed on May 8, 2017.

(51) Int. Cl.
| | |
|---|---|
| *H01S 3/091* | (2006.01) |
| *H01S 3/22* | (2006.01) |
| *H01S 3/04* | (2006.01) |
| *H01S 3/10* | (2006.01) |
| *H01S 3/02* | (2006.01) |
| *H01S 3/0941* | (2006.01) |
| *H01S 3/06* | (2006.01) |
| *H01S 3/16* | (2006.01) |
| *H01S 3/23* | (2006.01) |

(52) U.S. Cl.
CPC ............ *H01S 3/10013* (2019.08); *H01S 3/22* (2013.01); *H01S 3/025* (2013.01); *H01S 3/0606* (2013.01); *H01S 3/0941* (2013.01); *H01S 3/1616* (2013.01); *H01S 3/2341* (2013.01)

(56) References Cited

U.S. PATENT DOCUMENTS

| | | |
|---|---|---|
| 6,389,186 B1 | 5/2002 | Digiovanni et al. |
| 7,046,711 B2 | 5/2006 | Kopf et al. |
| 2002/0097769 A1 | 7/2002 | Vetrovec |
| 2011/0058249 A1 | 3/2011 | Erlandson |

FOREIGN PATENT DOCUMENTS

| | | | | |
|---|---|---|---|---|
| FR | 2936374 A1 | * | 3/2010 | ........... H01S 3/0604 |
| WO | 2005018060 A2 | | 2/2005 | |
| WO | 2011120009 A1 | | 9/2011 | |

OTHER PUBLICATIONS

International Preliminary Report on Patentability from PCT/US2018/031435, dated Nov. 12, 2019.

Extended European Search Report from EP app. No. 18799379.5, dated Dec. 3, 2020.

Communication pursuant to Rules 70(2) and 70a(2) EPC from EP app. No. 18799379.5, dated Dec. 22, 2020.

* cited by examiner

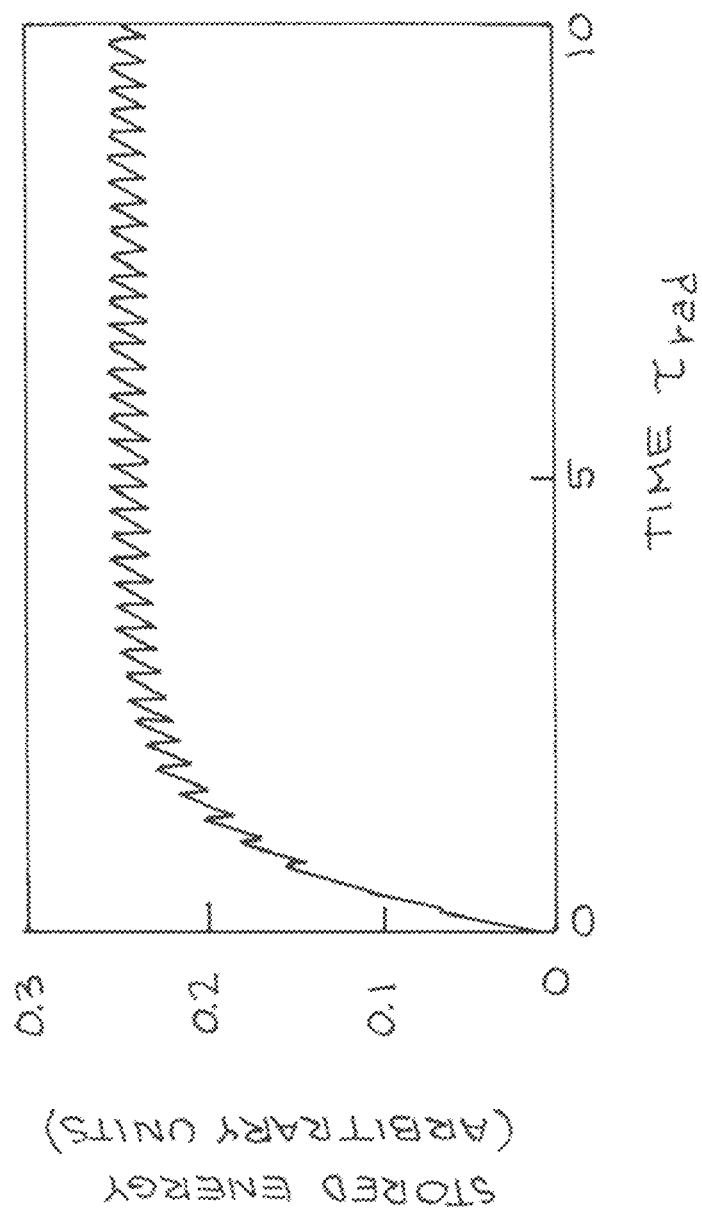

SCALING HIGH-ENERGY PULSED SOLID-STATE LASERS TO HIGH AVERAGE POWER

CROSS-REFERENCE TO RELATED APPLICATIONS

This application is a continuation-in-part of International Application No. PCT/US2018/031435 titled "Scaling High-Energy Pulsed Solid-State Lasers to High Average Power," filed May 7, 2018, incorporated herein by reference which claims the benefit of U.S. Patent Application No. 62/503,265 titled "A Method of Scaling High-Energy Pulsed Solid-State leasers to High Average Power," filed May 8, 2017, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relate to high-energy pulsed solid-state lasers, and more specifically, it relates to methods for scaling such lasers to high average power.

Description of Related Art

In nearly all pulsed solid-state laser amplifiers, gain media, such as laser slabs, are pumped by pulses of light that are emitted by flash lamps or diodes. When ions imbedded in the laser slabs absorb pump light, they transition from the unexcited ground state in which they normally reside to an electronically excited state. When sufficient numbers of ions have been pumped into the excited state and the slab has sufficient gain and stored energy, the laser pulse to be amplified is propagated through the slabs. Amplification occurs through the stimulated emission process in which excited-state ions give up their energy to the laser pulse while the pulse's directional, polarization and phase characteristics are preserved.

Advantages of Gain Media with Long Storage Lifetime

In high-energy (>10 J) pulsed solid-state lasers designed and built heretofore, all of which have used the single-pulse extraction (SPE) mode of operation, which is described below, efficient laser pumping requires pump-light pulses to be short compared with the fluorescence lifetime. Otherwise, fluorescence decay drains a significant fraction of the pumped ions bade to the ground state during the pump pulse. Impacts of fluorescence decay are reduced amplifier gain and reduced laser pulse energy. In some situations, however, in which it is necessary or desirable to produce a certain minimum amplifier gain or laser pulse energy, it is necessary or desirable to compensate for fluorescence decay by increasing peek diode pump-pulse power or energy. Either way, fluorescence decay reduces laser efficiency.

The cost of flash lamps or laser diodes scales with peak power. In turn, peak power scales inversely with the fluorescence lifetime. Therefore, to reduce system cost, it is desirable to use gain media with long fluorescence (storage) lifetime.

Advantages of Gain Media with Low Saturation Fluence (Well Below Damage Thresholds)

Efficient energy extraction requires that the cumulative fluence for the extracting beam be several times the saturation fluence. Cumulative fluence is the total fluence, found by summing the fluence over all passes the beam makes through amplifier. Cumulative fluence can be increased either by increasing the fluence per pass or by increasing the number of passes through the amplifier. The ability to increase fluence per pass is limited by optical damage risk. Specifically, to ensure reliable laser operation, the fluence per pass should remain well below the threshold for optical damage. On the other hand, the number of passes through the amplifier can also be limited. As a rule of thumb, it is relatively straightforward to achieve four or fewer passes through amplifiers, while it becomes more difficult to achieve more than four passes. For example, if multi-passing is achieved by using polarization rotation to switch the pulse into and out of the amplifier path, four or fewer passes can be achieved by using passive polarization-rotating components such as Faraday rotators, quartz rotators and half-wave plates. However, to achieve more than four passes, an active polarization-rotating component, e.g., a Pockels cell, is required. Pockets cells can add undesirable complications due to absorption of laser light and subsequent heating, generation of temperature gradients and concomitant birefringence of the Pockels cell crystal, particularly at high repetition rates. For large aperture sizes, transparent Pockels cell electrodes are needed to produce spatially uniform voltages and switching efficiency. Unfortunately, it has turned out to be difficult to develop transparent electrodes with high laser damage thresholds. Given these constraints on fluence and number of passes, it has until now been best design practice for high-energy lasers to choose gain media with sufficiently low saturation fluence that efficient extraction can be achieved in four or fewer passes.

The Problem: Gain Media that have Both Long Storage Lifetime and Low Saturation Fluence Simultaneously are Desired but do not Currently Exist.

To achieve high overall laser efficiency, both high pumping efficiency and high extraction efficiency are required. For efficient pumping, it is desirable to us gain media with long storage lifetime. For efficient extraction, as explained above, it is (usually) desirable to use gain media with low saturation fluence (several times lower than the damage fluence). Unfortunately, none of the gain media that are available today provide both long storage lifetime and low saturation fluence simultaneously. Gain media with long fluorescence lifetime tend to have high saturation fluence while gain media with low saturation fluence tend to have short fluorescence lifetime.

SUMMARY OF THE INVENTION

The present invention provides a method for scaling the average power of high-energy solid-state lasers to high values of average output power while maintaining high efficiency. One embodiment combines the gas-cooled-slab amplifier architecture with a pattern of amplifier pumping and extraction that is new to high-energy pulsed lasers, in which pumping is continuous and in which only a small fraction of the energy stored in the amplifier is extracted in any one pulse. Efficient operation is achieved by propagating many pulses through the amplifier during each period equal to the fluorescence decay time of the gain medium, so that the preponderance of the energy cycled through the upper laser level decays through extraction by the amplified pulses rather than through fluorescence decay. It is essential to choose a gain medium with a long fluorescence lifetime so that stored energy carries over from pulse to pulse. Gain media with long fluorescence lifetime tend to have high values of saturation fluence, which is acceptable with this method since only a small fraction of the stored energy needs to be extracted on any one pulse. In fact, a major advantage of this invention over the previous state of the art is that efficient energy extraction can be achieved at operating fluences that are lower than the damage fluence, even when the saturation fluence is many times greater than the damage finance. This is significantly different from previous high-energy pulsed laser designs, for which it has been important to use gain media having saturation fluence values that are lower than damage thresholds, so that the preponderance of the stored energy can be extracted on each shot without causing laser damage. Another advantage of our method is that it makes possible, for the first time in high-energy laser systems, to achieve efficient energy extraction from gain media that have exceptionally broad gain spectra but that also have high values of saturation fluence. This makes possible femtosecond-class chirped-pulse amplification (CPA) lasers that are simpler (one less laser stage) and more efficient than the titanium-doped sapphire lasers or optical parametric chirped pulse amplification (OPCPA) lasers that have been used to generate fs-class pulses up to the present.

The invention has a wide variety of uses, including in high-energy, high-average power lasers used for laser accelerator systems, medical applications, and generation of secondary sources (electrons, protons, x-rays and gamma rays) for scientific applications.

This high-energy laser design attains high overall laser efficiency by achieving both high extraction efficiency and high pumping efficiency (i.e., low fluorescence decay losses) simultaneously. In this design, pumping by laser diodes is continuous, which improves diode lifetime, simplifies the power conditioning system and reduces power-conditioning losses. Efficient extraction efficiency is achieved by propagating many pulses through the amplifier during each time period equal to the fluorescence decay lifetime. Even though the extraction efficiency for any one pulse is low—only a few percent—the fraction of stored energy extracted by the train of pulses is many times the fraction of energy that is lost to fluorescence decay. Effectively, this means that both pumping efficiency and extraction efficiency are high. This method is referred to herein as "multi-pulse extraction."

Since the extraction efficiency for any one pulse can be low, it is possible to use gain media with high saturation fluence in combination with relatively simple beamline designs, including designs in which the beam makes four or fewer beam passes through the amplifiers that do not require Pockets cells. The freedom to choose gain media with long fluorescence lifetimes can be advantageous, depending on the repetition rate required for the laser application. Specifically, we have shown that efficiency scales as $1/[1+1/(f_{ext}*R*t)]$, where $f_{ext}$ is the fraction of the excited state population extracted on each pulse, R is the repetition rate and t is the fluorescence lifetime. Efficiency increases as the term $f_{ext}*R*t$ increases. This analysis allows for optimization of our designs.

One embodiment combines the multi-pulse extraction technique with gas-cooled slabs. The gas-cooled-slab amplifier architecture enables pulse energy to be scaled to orders-of-magnitude higher values than have been achieved with either fiber lasers or thin-disk lasers. At the same time, the gas-cooling technique is a proven, effective way of removing waste heat produced in laser slabs by pumping processes, which allows scaling to high average power.

The multi-pulse extraction method has additional, indirect advantages. For example, when gain media with high values of saturation fluence are used, the stimulated emission cross section is lower, transverse gain is lower and ASE losses are lower, compared to other gain media. This results in higher efficiency (due to reduced ASE losses) and the option to efficiently store more energy per slab. An additional advantage is that efficient energy extraction can be achieved while pulse distortion due to gain saturation remains low, since only a small fraction of the stored energy need be extracted on any one pulse. Another advantage is that efficient energy extraction can be achieved while incurring a smaller nonlinear phase shift, since the gain coefficient can remain high during the entire pulse, which in turn minimizes the power of the injected pulse needed at the end of the pulse to produce a desired output pulse shape. This advantage of reduced nonlinear phase shift is highly significant for short-pulse lasers for which high values of nonlinear phase shift and changes in nonlinear phase shift during the pulse can degrade recompressed pubes. This degradation is manifested by undesirable increases in pulse duration and reductions in peak output power.

The present invention enables the construction of high-energy laser systems in which efficient energy extraction is achieved from gain media that have sufficiently broad gain spectra to support the generation of short pulses (femtosecond to picosecond duration) and that also have long storage lifetimes that are conducive to diode pumping, as described above. Without the present invention, high extraction efficiency from such gain media tends to be low, since such gain media generally have high values of saturation fluence.

An embodiment of the design uses gas-cooled slabs of Tm-doped lithium-yttrium fluoride (YLF). Tm-doped YLF has a fluorescence lifetime of about 15 ms and a saturation fluence of 20-50 $J/cm^2$, depending on the wavelength at which the laser is operated. The two multi-slab amplifiers are passed four times by an injected laser pulse. Slabs are kept thin to keep tensile thermal stresses below fracture limits. Although the beam fluence is kept far below the saturation fluence and far below the expected laser damage threshold, the optical-to-optical efficiency (laser output power relative to diode pump power) is high, up to 40%. Calculations show the laser can produce 30-J pulses at 10 kHz for an average output power of 300 kW. This combination has high pulse energy, high average power, high efficiency and relative simplicity (e.g., no need to invoke coherent beam combining).

In quasi-three-level lasers, the energy of the lower laser level is close enough to the ground state that the lower laser level is thermally populated. This stands in contrast with four-level lasers, in which the energy of the lower laser level is far enough above the ground state to have insignificant thermal population. A key advantage of quasi-three-level lasers over four-level lasers is that the energy difference between pump photons and laser photons is smaller, which, taken by itself, is advantageous for achieving higher laser efficiency and for reducing waste heat deposited in the gain medium by pumping; processes. On the other hand, quasi-three-level lasers have the disadvantage that the thermal population in the lower laser level absorbs energy at the laser wavelength, which reduces efficiency. Since no laser adieu occurs when the gain medium is a net absorber, a fraction of the pump light energy must be used simply to pump the gain medium to transparency, the point at which the stimulated gain of the upper-laser-level population is just large enough to compensate for the absorption of the lower-laser-level population. Only the portion of the excited-state population that is above the transparency level contributes to laser amplification and to the transfer of energy from the gain medium to the laser beam. In traditional high-energy lasers, in which a pump pulse precedes the extracting pulse on every shot and in which there is no carryover of stored energy from shot to shot, the gain medium must be pumped to transparency anew on every shot. The fraction of pump-pulse energy used simply to pump to transparency can by large, with values of 10-30% not uncommon. The need to pump to transparency on every shot can severely limit laser efficiency.

A method for improving quasi-three-level laser efficiency is to reduce the operating temperature. Reducing the temperature reduces the lower-laser-level population which in turn reduces lower-level absorption. With sufficient temperature reduction, the fraction of the pump energy needed to pump to transparency is reduced, often to insignificant levels. In such cases, the quasi-three-level laser has effectively been converted to a four-level laser, with attendant higher efficiency. The ~100 J/10 Hz DiPOLE laser, which employs Yb3+-doped YAG laser crystals at ~200K, uses this method. The efficiency of other rare-earth ions that operate as quasi-three-level lasers, such as Tm3+, Er3+, and Ho3+ and Nd3+ (at 920 nm) also benefit from reduced temperature. However, reducing temperature adds cost and complexity to the laser system and can itself adversely affect efficiency, since power must be provided to operate temperature control systems.

The present invention offers another way to improve the efficiency of quasi-three-level lasers. Specifically, when a long, continuous train of pulses is produced, while the gain medium is pumped continuously, the gain medium needs to be pumped to transparency only once, at the beginning of the pulse train. After that, only a small fraction of the pump power is needed to maintain transparency. This fraction scales as the time between pulses divided by the fluorescence lifetime of the gain medium. For the $Tm^{3+}$ laser design that we have developed, which operates at 10,000 Hz, the fraction of CW pump power needed maintain transparency is reduced as compared the fraction of pulsed power needed to produce transparency anew on each shot. This advantage is achieved at room temperature, without the need to chill the gain medium to cryogenic temperatures.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1A shows stored energy vs. time for the multi-pulse extraction (MPE) mode of operation.

DETAILED DESCRIPTION OF THE INVENTION

The present invention provides a method of multi-pulse extraction (MPE) for scaling up the average power of high-energy solid-state lasers while maintaining high efficiency. MPE can be applied when the pulse repetition rate, PRF, is approximately equal to or greater than the inverse of the storage lifetime, $\tau_{storage}$, i.e., when $PRF^*\tau_{storage} \geq 1$. With MPE, pumping is continuous and only a small fraction of the energy stored in the amplifier is extracted by any one seed pulse. MPE stands in contrast with single-pulse extraction (SPE), in which a pump pulse of finite duration precedes each extracting pulse, FIG. 1 illustrates key differences between these two modes of operation.

Figure 1B:
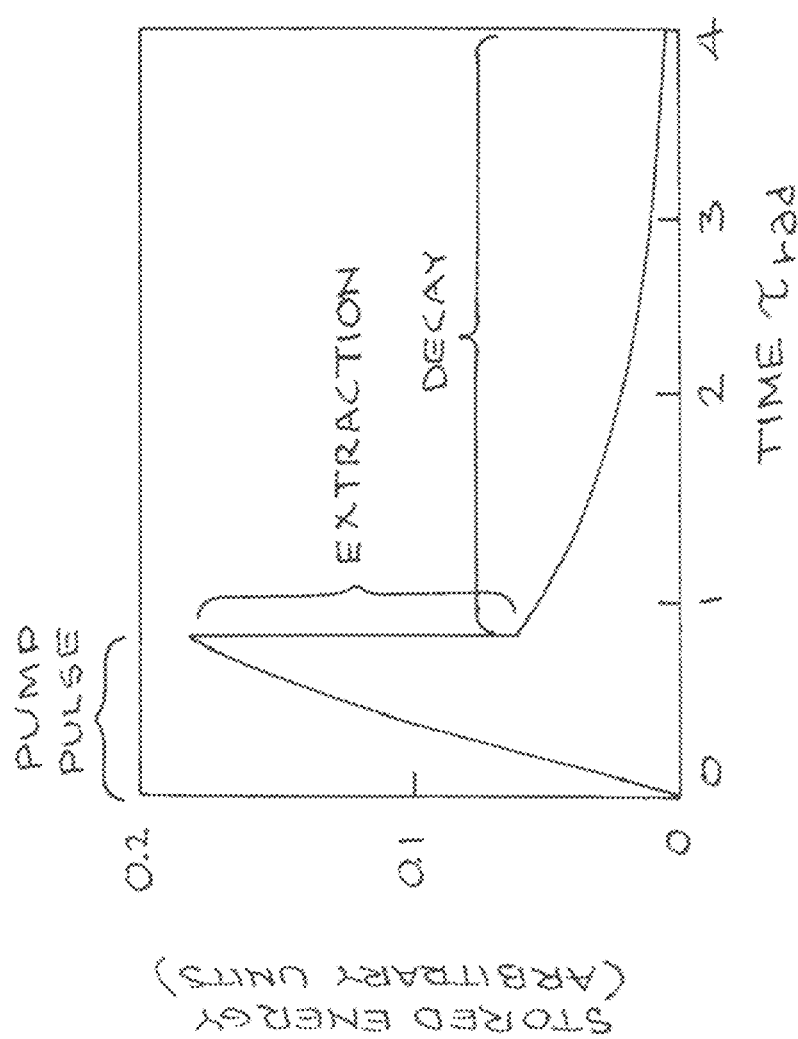
FIG. 1B shows stored energy vs. time for the single-pulse extraction (SPE) mode of operation.

FIG. 1A shows stored energy vs. time for the multi-pulse extraction (MPE) mode of operation. FIG. 1B shows stored energy vs. time for the single-pulse extraction (SPE) mode of operation. Time is normalized with respect to the radiative lifetime of the gain medium so that results are valid for gain media having different radiative lifetimes. In the MPE example in FIG. 1A, the gain medium is pumped continuously at a constant rate starting at time zero. Extracting pulses, which extract about 10% of the stored energy each, are passed through the gain medium at a rate of four such pulses per radiative lifetime. As can be seen, stored energy falls sharply upon the passage of each amplified seed pulse, with energy reduction occurring on a time scale that is short compared with the one radiative lifetime. After 2-3 radiative lifetimes, stored energy settles into a regular repeating pattern. An important characteristic of MPE that contributes to high efficiency is that stored energy that is not extracted on one pulse carries over to help amplify subsequent pulses. Another important characteristic of MPE is that for quasithree-level lasers, the initial pump energy required to pump the gain medium to transparency is expended once, during the initial settling period, after which only a small fraction of the pump power is expended to maintain transparency. In the SPE example of FIG. 1B, the gain medium is pumped for a duration of ~83% of one radiative lifetime. At the end of this pump pulse, ~67% of the stored energy is extracted by a pulse that passes perhaps several tis through the gain medium. After the extracting pulse, the remaining stored energy decays away and does not contribute to the amplification of any subsequent pulses. Additionally, for quasi-three-level lasers, the pump energy required to pump the gain medium to transparency is expended on every pulse.

Figure 2:
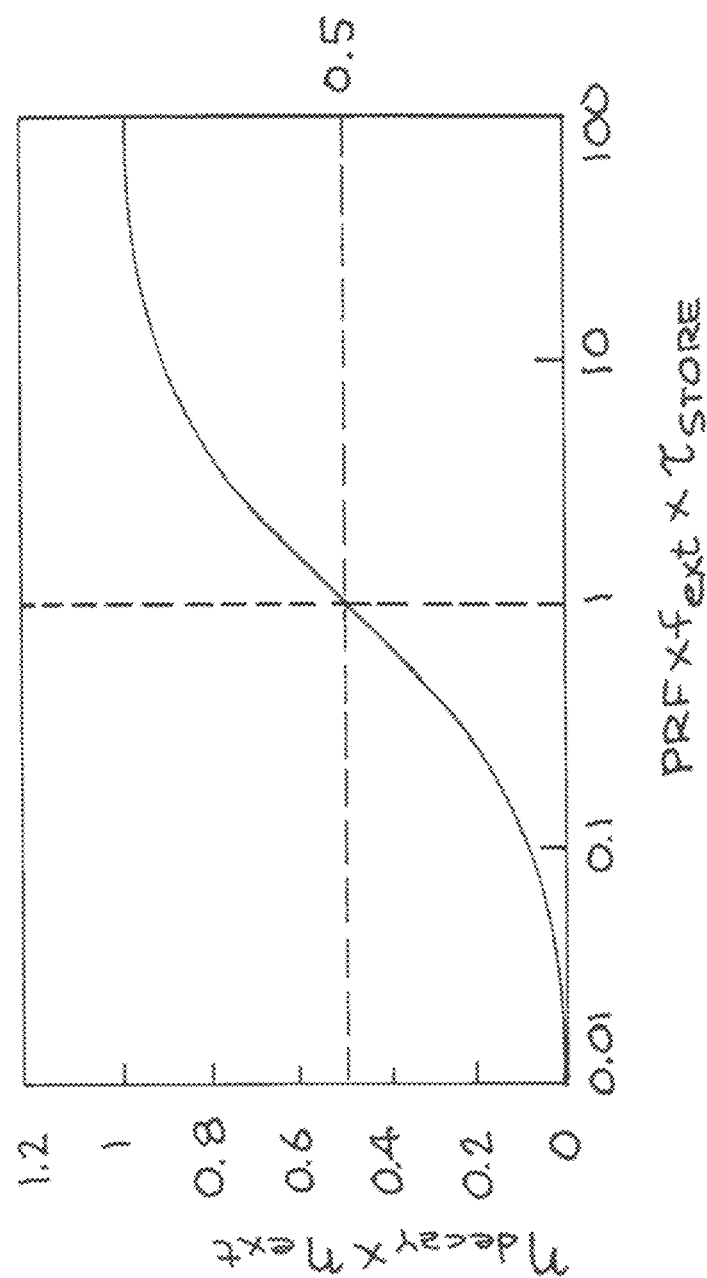
FIG. 2 shows the $\eta_{decay}\eta_{ext}$ product plotted vs. $PRF \cdot f_{ext} \cdot \tau_{storage}$.

The long-term efficiency in the steady-state regime for the MPE mode, after the initial transient or settling-in period, can be calculated using the formula $$\eta_{decay}\eta_{ext} = \frac{R_{ext}}{R_{ext} + R_{decay}} = \frac{PRF \cdot f_{ext} \cdot \tau_{storage} \cdot \left[1 - e^{-1/(PRF \cdot \tau_{storage})}\right]}{\left[1 - (1 - f_{ext}) \cdot e^{-1/(PRF \cdot \tau_{storage})}\right]} \quad (1)$$

where $\eta_{decay}$ is the time-averaged fraction of the excited-state population that does not undergo decay between shots; $\eta_{ext}$ is the time-averaged fraction of the excited-state population that is extracted; $R_{ext}$ is the extraction rate, which is given by the product of the pulse repetition frequency PRF and the fraction of stored energy extracted on each shot $f_{ext}$; and the decay rate $R_{decay}$ the inverse of the instantaneous storage lifetime $\tau_{storage}$. Since all excited-state ions that are not extracted are lost to decay, it makes little sense to consider either one separately. Rather, we consider the product of the two together. FIG. 2 shows the $\eta_{decay}\eta_{ext}$ product plotted versus the product $PRF \cdot f_{ext} \cdot \tau_{storage}$. As expected, efficiency approaches zero in the limit of low $PRF \cdot f_{ext} \cdot \tau_{storage}$, since nearly all ions are lost to decay. Efficiency rises as $PRF \cdot f_{ext} \cdot \tau_{storage}$ product is increased. As the $PRF \cdot f_{ext} \cdot \tau_{storage}$ product is increased further, the $\eta_{decay}\eta_{ext}$ efficiency product approaches unity. This plot is general and applies to all amplifiers operating in the multi-pulse extraction mode.

An illustrative simplification can be made by deriving the product $\eta_{decay}\eta_{ext}$ by calculating the ratio of the time-averaged extraction rate divided by the time-averaged total decay rate. This yields the much simpler expression;

$$\eta_{decay}\eta_{ext} \simeq \frac{PRF \cdot f_{ext} \cdot \tau_{storage}}{1 + PRF \cdot f_{ext} \cdot \tau_{storage}}, \quad (2)$$

This simpler form accurately describes the efficiency product for small values of the extraction fraction, $f_{ext} \leq 0.2$ and slightly underestimates the efficiency product for larger values of $f_{ext}$. An important use of equation (2) is to determine the $PRF \cdot f_{ext} \tau_{storage}$ product needed to achieve a specified or required value of the $\eta_{decay}\eta_{ext}$ efficiency:

$$PRF \cdot f_{ext} \cdot \tau_{storage} \simeq \frac{1}{\frac{1}{\eta_{decay}\eta_{ext}} - 1} \quad (3)$$

Once a gain medium has been chosen, the storage lifetime $\tau_{storage}$, can be calculated using the usual methods, which take into account the radiative decay rate, $1/\tau_{rad}$, the ampli-fied spontaneous emission decay rate, the concentration quenching rate, upconversion rates and other potentially significant important decay mechanisms. For efficient, well-designed systems, it is often the case that $\tau_{storage} \sim \tau_{rad}$, i.e., these other possible decay mechanisms are small enough that they can be ignored. For a specified PRF, the value of $f_{ext}$ needed to achieve the required efficiency can be determined uniquely. Specifically, with straightforward rearrangement of the equation above, we obtain:

$$f_{ext} \simeq \frac{1}{\left(\frac{1}{\eta_{decay}\eta_{ext}} - 1\right) \cdot PRF \cdot \tau_{storage}} \quad (4)$$

Figure 3A:
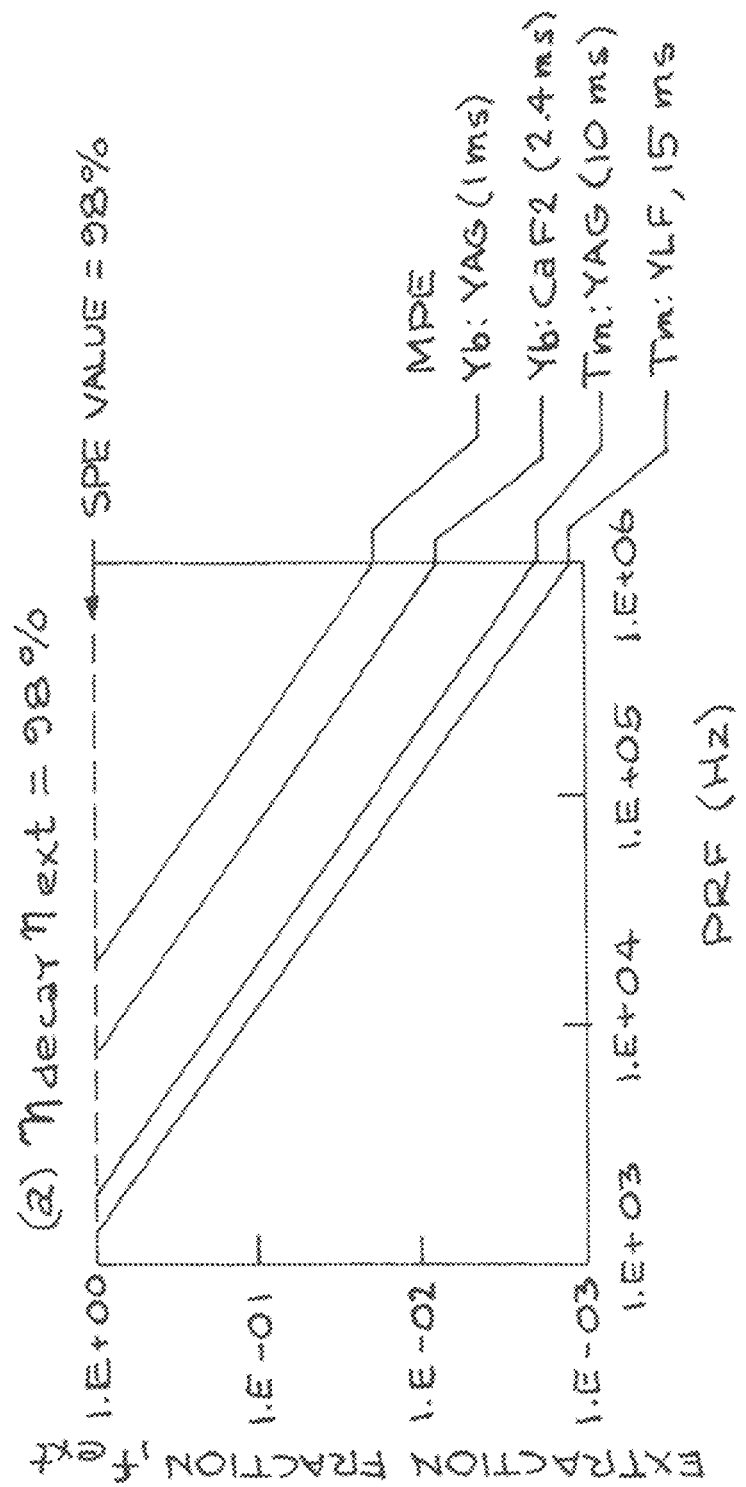
FIG. 3A shows values of $f_{ext}$ required at specified repetition rates to achieve $\eta_{decay}\eta_{ext}=0.98$ when MPE is used in various laser gain materials.
Figure 3B:
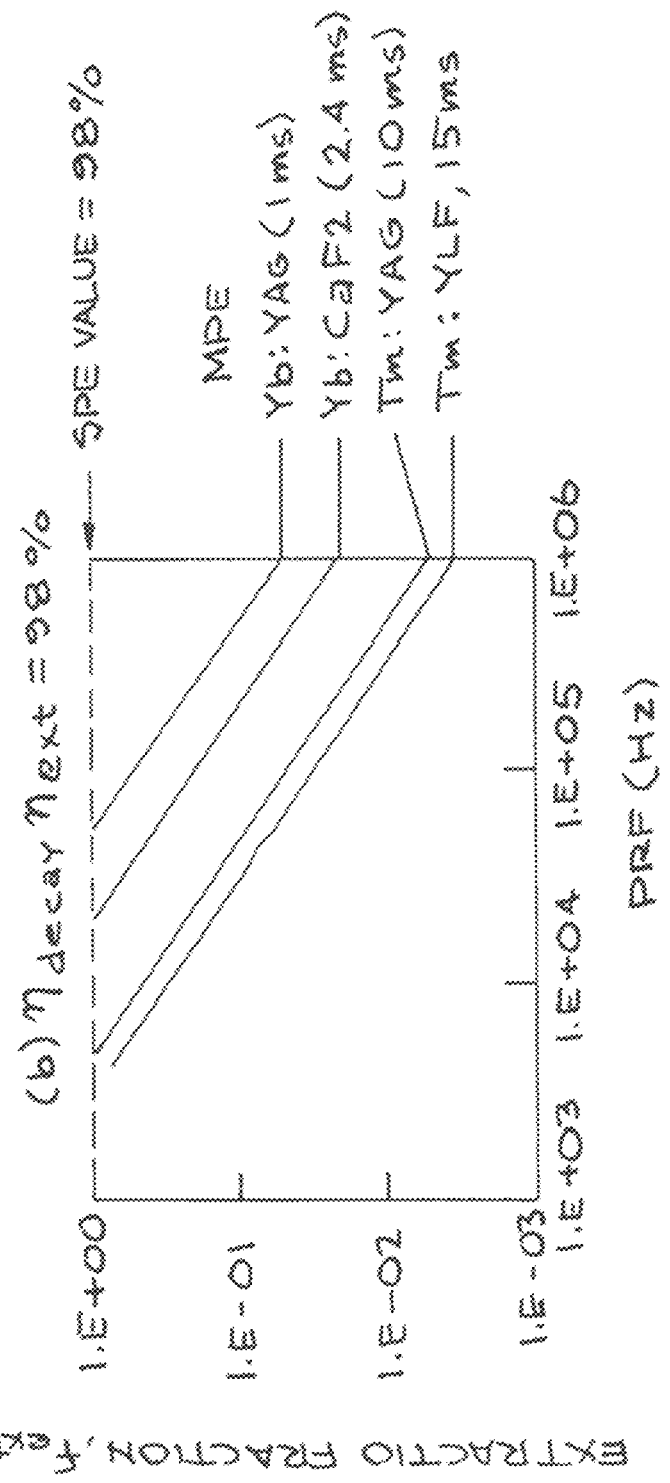
FIG. 3B shows values of $f_{ext}$ required at specified repetition rates to achieve $\eta_{decay}\eta_{ext}=0.98$ when MPE is used in various laser gain materials.

FIG. 3A shows values of $f_{ext}$ required to achieve specified values of $f_{ext}$ for $\eta_{decay}\eta_{ext}=0.95$ when MPE is used. FIG. 3B shows values of $f_{ext}$; required to achieve specified values of $f_{ext}$ for $\eta_{decay}\eta_{ext}=0.98$ when MPE is used. These two values of $\eta_{decay}\eta_{ext}$ are provided as examples, although any value $\eta_{decay}\eta_{ext}$ could have been used. The calculated values of $f_{ext}$ are plotted for four different gain media (solid curves), which have been chosen since they have significantly different storage lifetimes. FIGS. 3A and 3B also show values of $f_{ext}$ required to achieve $\eta_{ext}=0.95$ and $\eta_{ext}=0.98$, respectively, when SPE is used (dashed curves). For these SPE cases, the required values of $f_{ext}$ are trivially equal to since energy is extracted on a single pulse. Nonetheless, by comparing the dashed curves (single-pulse extraction) with the solid curves (multi-pulse extraction), we can readily see another significant advantages of multi-pulse extraction relative to single-pulse extraction: high values of extraction efficiency ($\eta_{decay}\eta_{ext}$ for MPE and $\eta_{ext}$ for SPE) can be achieved at values of $f_{ext}$ that are lower, and in some cases orders of magnitude lower, for MPE than for SPE. Being able to operating lasers at low $f_{ext}$ has significantly advantages, such as simplified design and/or reduced operating fluency, which reduces optical damage risk. These issues are discussed below. Not that for these cases, we have used the simplification $\tau_{storage}=\tau_{rad}$. Thus, values of $f_{ext}$ needed to achieve a specified efficiency are lower for MPE than they are for SPE.

Analysis of Performance and Design Tradeoffs

Now we turn our attention to calculating $\eta_{ext}$ and $f_{ext}$ using the Frantz-Nodvik (FN) formalism for analyzing saturated gain. A commonly used equation;

$$G_{out}=\ln[1+e^{G_s}(e^{G_{in}}-1)] \quad (4)$$

uses fluence terms that have been normalized with respect to the saturation fluence $\varphi_{sat}$ of the gain medium, which renders the equation useful for gain media with different values of saturation fluence. Specifically, the normalized fluence terms are: $G_s=\varphi_{stored}/\varphi_{sat}$, $G_{in}=\varphi_{in}/\varphi_{sat}$, where $\varphi_{stored}$, $\varphi_{in}$, and $\varphi_{out}$ are the fluence stored in the amplifier, the input fluence, and the output fluence, respectively. Since normalized fluence is used, rather than energy, the results are useful for laser beams of various transverse dimensions and pulse energies, as scaling the transverse dimensions of the laser beam is a method for scaling the energy of the laser. Specifically, the extractable stored energy in the laser beam is given by $E_{stored}=A_{beam}*\varphi_{stored}$, the injected pulse energy is given by $E_{in}=A_{beam}*\varphi_{in}$ and the output pulse energy is given by $E_{out}=A_{beam}*\varphi_{out}$, where $A_{beam}$ is the cross-sectional area of the laser beam. In this simplified example, the area $A_{beam}$ is constant as the beam propagates from the injection plane, through the amplifier and on to the output plane, although different amplifier arrangements can be used in which the beam area changes.

Applying energy conservation gives the change in stored fluence due to amplification of the pulse:

$$\Delta G = G_{s,initial} - G_{s,final} = G_{out} - G_{in} \quad (5)$$

where $G_{s,initial}$ and $G_{s,final}$ are the normalized stored fluence before and after passage of the pulse, respectively. These equations can be applied repeatedly, once for each pass, to calculate output fluence, gain, and extracted energy for multiple passes of the pulse through an amplifier. Passive losses can be accounted for by reducing the fluence between passes. At the end of these calculations, the extraction fraction is given by:

$$f_{ext} = \frac{G_{s,initial} - G_{s,final}}{G_{s,initial}} \quad (6)$$

where $G_{s,initial}$ and $G_{s,final}$ now represent the normalized stored fluence before and after the beam passes, respectively.

Figure 4:
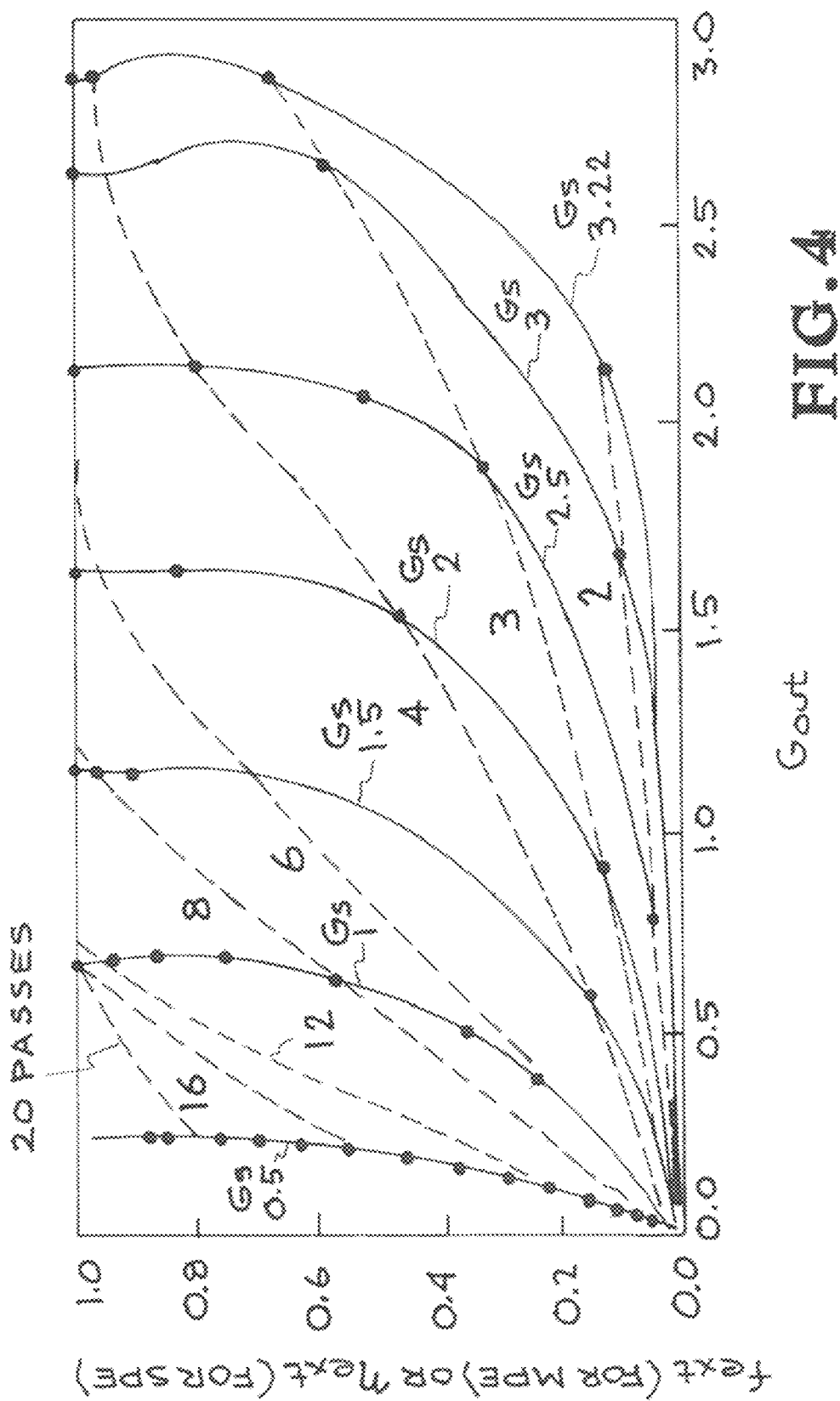
FIG. 4 shows extraction fraction vs. maximum normalized output fluence $G_{out}$ for a multi-passed amplifier, assuming a single-pass transmittance T=0.90.

FIG. 4 shows extraction fraction $f_{ext}$ plotted versus the output fluence $G_{out}$ for a multi-pass amplifier. For all curves, single-pass transmission and normalized injected fluence are 0.90 and 0.001, respectively. Curves are plotted for each of seven different values of normalized stored fluence, $G_s$, which range from 0.05 to 3.22; these values of stored fluence correspond to single-pass gain values ranging from 1.65 to 25.0. In generating the curve for each value of $G_s$, the number of passes taken by the laser pulse through the amplifier was varied, from 2 up to 20. For each curve, $G_{out}$ initially increases due to greater amplification as more passes are taken and $f_{ext}$ rises monotonically with $G_{out}$. Eventually, $f_{ext}$ approaches unity and $G_{out}$ attains a maximum value due to gain saturation. At this point $G_{out}$ is a large fraction of $G_s$. (Ignore the portions of the curves that show extraction efficiency decreasing with $G_{out}$ as these are artifacts of the curve-plotting routine provided in Microsoft Excel.) FIG. 4 also shows curves indicating the number of passes required to produce the specified value of $G_{out}$, which have been overlaid on the curves corresponding to the different values of $G_s$. The number of passes required to attain high extraction efficiency decreases monotonically with $G_s$. For example, for $G_s$=3.22 (corresponding to single-pass small-signal gain of 25), only 4 passes are required to attain near-unity $\eta_{ext}$. For $G_s$=0.5 (corresponding to single-pass small-signal gain of 1.65), ~30 passes are required.

Figure 5:
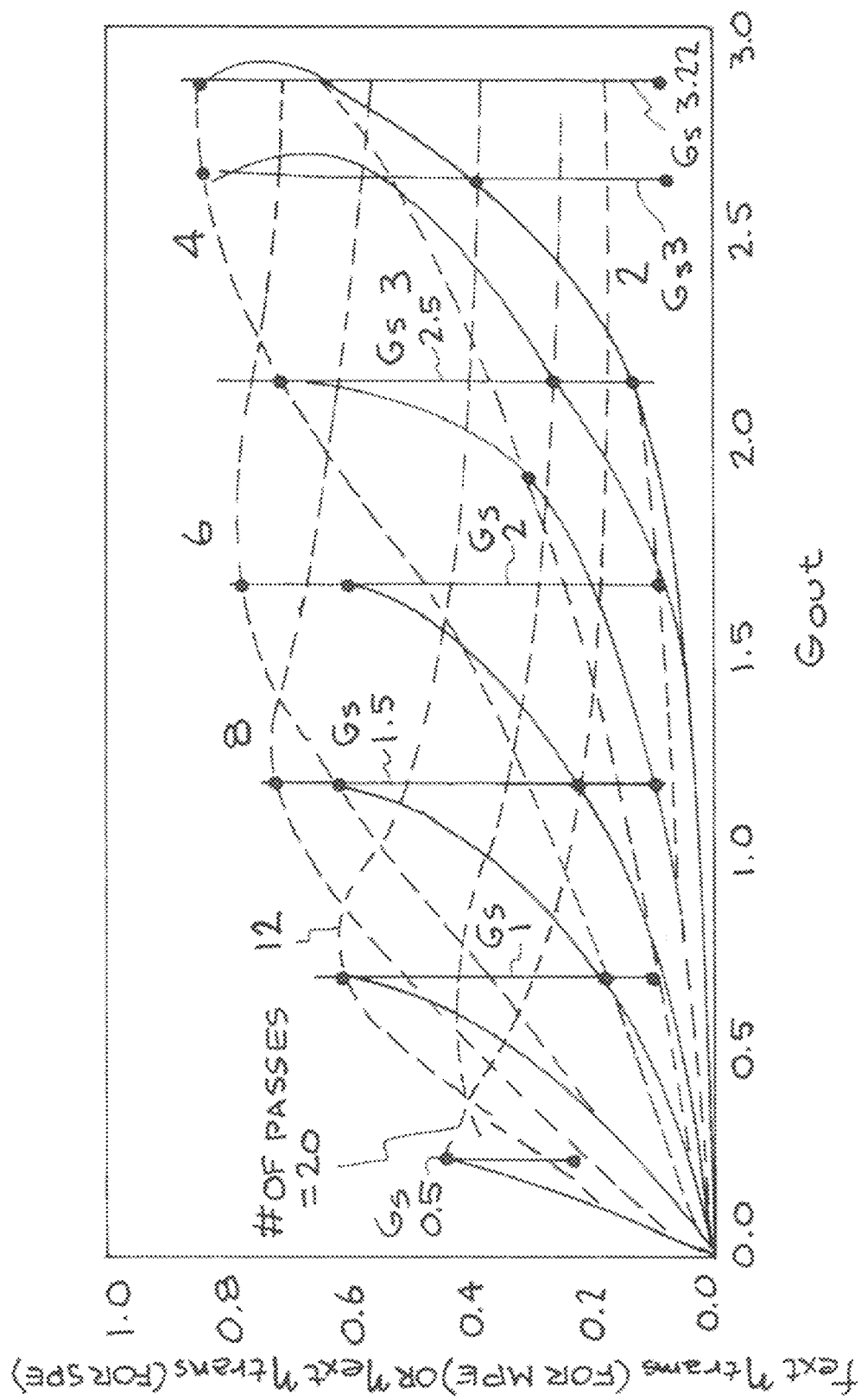
FIG. 5 shows $f_{ext}\eta_{trans}$ plotted vs. $G_{out}$.

FIG. 4 is somewhat incomplete in that the ordinate does not include the effect of transport losses, which also need to be accounted for in laser design. Transport losses occur when optics absorb, scatter, reflect, or transmit light in ways that reduce energy in the laser beam. The total energy lost to transport is the sum of all the energy losses occurring each time the pulse interacts with a lossy optic. Transport efficiency for a multi-passed amplifier is given by:

$$\eta_{trans} = 1 - \frac{E_{lost}}{E_{in} + E_{ext}} \quad (7)$$

where $E_{lost}$ is the total energy lost in transport, $E_{in}$ is the infected energy, and $E_{ext}$ is the energy extracted from the amplifier. FIG. 5 shows $f_{ext}\eta_{trans}$ plotted vs. $G_{out}$. As in FIG. 4, results are given for different values of $G_s$, and the number of passes is scanned from 2 to 20. Curves showing the number of passes needed to achieve $G_{out}$ are overlaid.

For each value of $G_s$, $f_{ext}\eta_{trans}$ and $G_{out}$ initially increase with the number of passes. However, after a certain number of passes have been taken, $f_{ext}\eta_{trans}$ achieves a peak value and then falls sharply. After $f_{ext}\eta_{trans}$ has peaked, values of $G_{out}$ are clamped and do not rise further. This behavior is due to transport losses, which rise sharply after a large fraction of the stored energy has been extracted. For those cases gain is reduced and transport losses become relatively more important. The number of passes needed to achieve the maximum value of $f_{ext}\eta_{trans}$ decreases as $G_s$ increases.

FIG. 5 shows the product of extraction fraction and transport efficiency vs. maximum normalized output fluence for a multi-passed amplifier, assuming a single-pass transmittance T=0.90. (Ignore the portions of the curves that show extraction efficiency decreasing with $G_{out}$ as these are artifacts of the curve-plotting routine provided in Microsoft Excel.)

Figure 6:
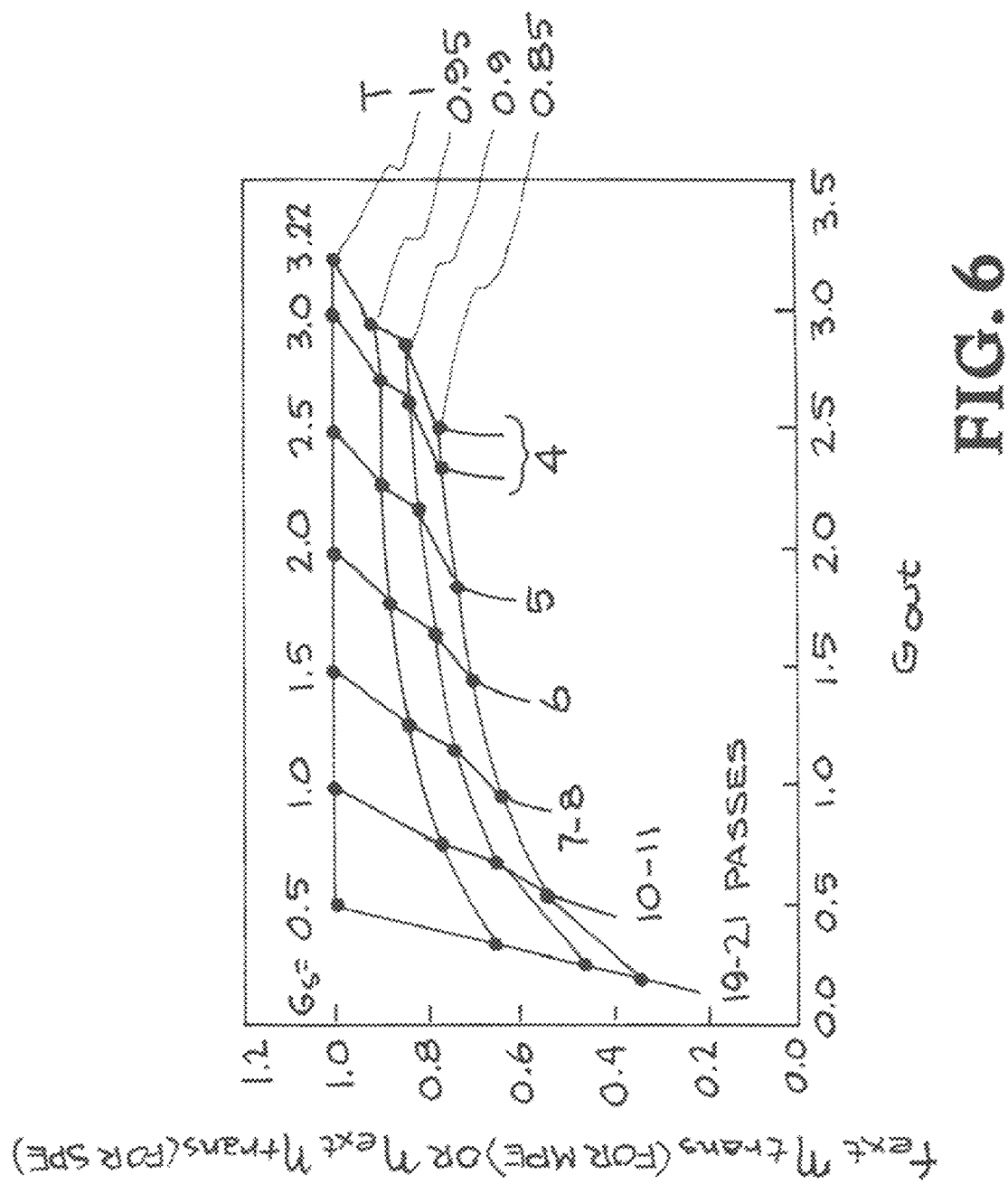
FIG. 6 shows extraction fraction times transport efficiency $f_{ext}\eta_{trans}$ vs. maximum normalized output fluence $G_{out}$ for multi-passed amplifiers with single-pass transmission values of 0.85, 0.90, 0.95 and 1.0.

By connecting the maximum values for the curves in FIG. 5, an envelope is formed that gives the maximum value of $f_{ext}\eta_{trans}$ vs. $G_{out}$. FIG. 6 shows four such envelopes, which were calculated for single-pass transmittance values of 0.85, 0.90, 0.95, and 1.00. Superimposed are curves showing the number of passes needed to achieve $G_{out}$. Somewhat remarkably, the modeling shows a one-to-one correspondence between the number of passes required to achieve a particular value of $G_{out}$ and the normalized stored fluence $G_s$, with the number of passes decreasing as $G_s$ increases. Accordingly, superimposed curves are labeled both with the number of passes needed and the value of $G_s$. Additional modeling, not shown here, indicates that the $f_{ext}\eta_{trans}$ vs. $G_{out}$ curves for different values of T are nearly unchanged as $G_{in}$ is varied through reasonable values, although the number of passes required to achieve a particular value of $G_{out}$ falls as $G_{in}$ is increased.

FIG. 6 shows extraction fraction times transport efficiency $f_{ext}\eta_{trans}$ vs. maximum normalized output fluence $G_{out}$ for multi-passed amplifiers with single-pass transmission values of 0.85, 0.90, 0.95 and 1.0. The seed fluence is held constant at $G_{in}$=0.001. FIG. 6 illustrates several important principles of laser design as well as several important considerations when evaluating gain media for use in laser designs. For realistic systems, in which the single-pass transmission is T<1, the product $f_{ext}\eta_{trans}$ increases monotonically with $G_{out}$, $f_{ext}\eta_{trans}$ becomes unity only in the idealized lossless case (T=1), where it remains unity regardless of $G_s$. As T decreases, the $f_{ext}\eta_{trans}$ vs. $G_{out}$ curses shift downward. Additionally, the maximum value of $G_{out}$ that is attained for any given value of $G_s$ decreases. $G_{out}$ is always less than or equal to $G_s$, with the equality obtained only when T=1. Sensitivity to passive losses increases, i.e., $f_{ext}\eta_{trans}$ falls, as single-pass gain decreases. Multi-pass amplifiers operating at $G_{out}$>2.2 achieve high values of $f_{ext}\eta_{trans}$ extraction fraction in ≤4 passes, provided that $G_{in}$>0.001 and T≥0.85. There can be significant advantages to operating a beamline with four or fewer passes.

Gain Media Choices for MPE and SPE

Figure 7:
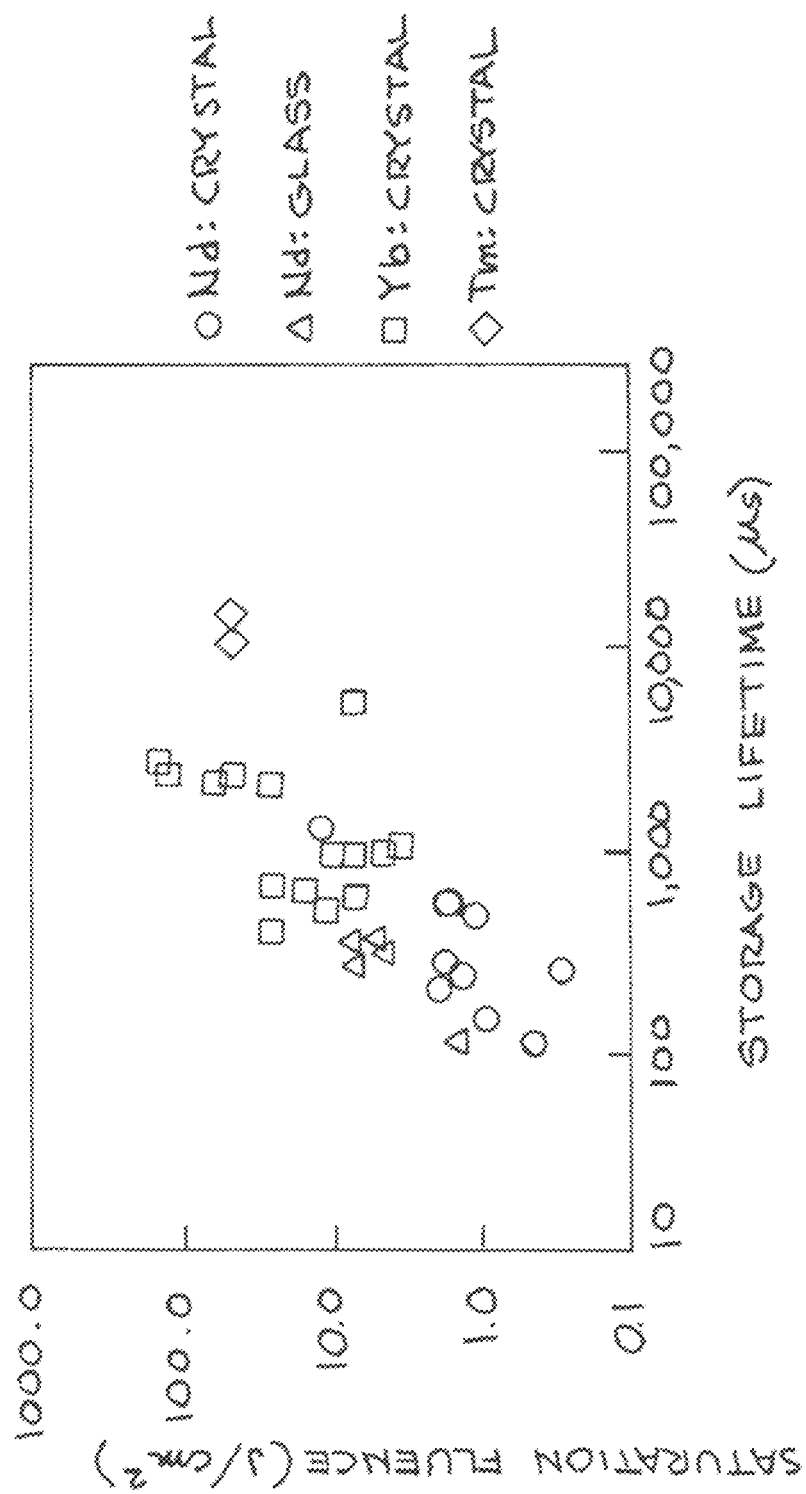
FIG. 7 shows saturation fluence vs. storage lifetime for a variety of different gain media.

The gain-medium parameters of $\varphi_{sat}$ and $\tau_{storage}$ are key factors in determining extraction traction and extraction efficiency in MPE. FIG. 7 shows saturation fluence vs. storage lifetime for a variety of different gain media. FIG. 7 is a plot of two intrinsic material parameters for common Nd-, Yb-, and Tm-doped gain media: $\varphi_{sat}$ and $\tau_{storage}$. Gain media near the bottom left of this plot tend to be efficient in SPE white those at the top right tend to be quite efficient in MPE.

The plot shows a correlation between the two, as there is a tendency for gain media with long storage lifetime to have high saturation fluence. Gain media with low values of $\varphi_{sat}$ and $\tau_{storage}$, in the lower left-hand corner of the plot, usually work well and have high efficiency, in SPE mode. They tend not to be candidates for MPE because their storage lifetimes tend to be short compared with the time between pulses for many application needs. However, gain media with high values of $\varphi_{sat}$ and $\tau_{storage}$, in the upper right-hand corner of the plot, tend not to work well in the SPE mode because damage fluences tend to be lower than the fluences needed for efficient extraction. However, they work well in the MPE mode because of their long lifetimes.

Exemplary Design Steps

This section outlines a series of steps that one might take to determine ranges of design parameters that use MPE, that operate at fluences below damage threshold and that meet efficiency requirements. After identifying these ranges, more detailed analysis and other considerations need to be applied to down-select and optimize designs. However, these steps are useful for quickly eliminating designs that do not meet requirements, for identifying the most attractive designs and for estimating design performance. These steps are:

1) Identify the key, top-level performance requirements of the system being designed. These include output pulse energy ($E_{out}$), pulse repetition rate (PRF) pulse shape, pulse duration ($\tau_{pulse}$), and various efficiency terms which can include extraction efficiency ($\eta_{ext}$), decay efficiency ($\eta_{decay}$) and transport efficiency ($\eta_{trans}$).

2) Choose a candidate gain medium. Gain media that are good candidates for MPE designs must have values for the radiative lifetime, $\tau_{rad}$ that are comparable to or greater than the inverse of the PRF. Presumably, the designer has access to published results for various gain media that include $\tau_{rad}$, optimum laser wavelengths ($\lambda_{laser}$), optimum pump wavelengths ($\lambda_{laser}$), radiative lifetime ($\tau_{rad}$), saturation fluence ($\varphi_{sat}$) and other properties.

3) Estimate the maximum safe operating fluence ($\phi_{damage}$) above which the laser pulse is apt to cause damage to an optical component, $\phi_{damage}$ depends on the laser wavelength, the pulse duration and the quality of optics provided by optical vendors.

4) Estimate the minimum cross-sectional area of the laser beam needed to safely produce the required pulse energy. This minimum area, $A_{beam,min}$, is given by $$A_{beam,min} = \frac{E_{out}}{\varphi_{damage}} \tag{8}$$

5) Determine whether the optical components that are available from vendors, including the amplifier gain elements (slabs, disks, or rods), are available in sizes that are large enough to transmit single laser beams of the required minimum size. Optics should be large enough to accommodate not only the beam but also to accommodate beam alignment errors, mounting allowances and other necessary allowances and tolerances.

6) If the gain media or other optics are not available in large-enough sizes to provide the required output pulse energy in a single beamline, decide whether: 1) to use more than one beamline to produce the required energy, or 2) to return to step 2) above and choose a different gain medium for which larger components might be available. This choice will depend on the application, whether the output pulse needs to be produced in one coherent beamline, space requirements, costs and other issues.

7) For each candidate gain medium, determine the saturation fluence ($\phi_{sat}$). If saturation fluence is not given explicitly, it can be calculated using standard formulas provided that the stimulated emission cross section and the absorption cross section are known at the laser wavelength.

8) Use results from steps 3) and 7) to calculate the maximum normalized output fluence, $G_{out,max}$, that corresponds to the optical damage limit:

$$G_{out,max} = \frac{\varphi_{damage}}{\varphi_{sat}} \tag{9}$$

9) Using the required efficiencies and equation (3) above, determine the minimum value of extraction fraction, $f_{ext,min}$, that corresponds to the efficiency requirements.

10) Use the results front steps 8) and 9) above, along with a graph like the one in FIG. 5, to determine the range of designs that meet efficiency requirements while operating at a fluence below the optical damage limit. These are the designs which lie above the horizontal line given by $$f_{ext} \geq f_{ext,min} \tag{10}$$

and which also lie to the left of the vertical line given by $$G_{out} \leq G_{ext,max} \tag{11}$$

Use of FIG. 5 is appropriate for designs for which the single-pass transmission T=0.9, and for which the injected fluence is $G_{in}$=0.001. However, should T and $G_{in}$ have different values, FIG. 5 should be replaced with a similar graph that has been constructed using the appropriate values of T and Gin.

Figure 8:
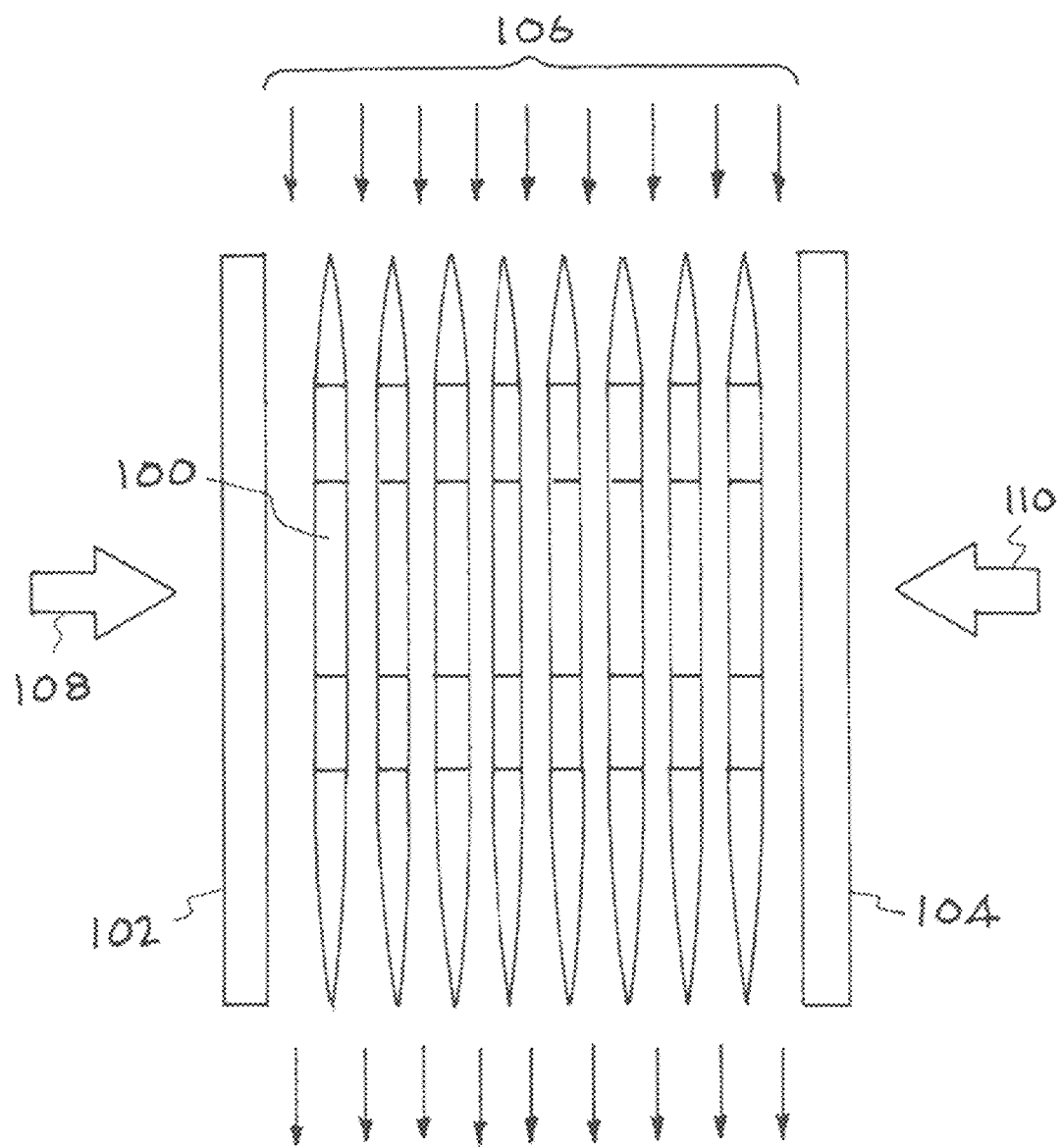
FIG. 8 illustrates a gas cooled optical amplifier.

FIG. 8 illustrates a gas cooled optical amplifier. A plurality of slab gain media 100 are located between optical windows 102 and 104. There are openings between each of the active medium so that He gas cooling 106 can flow between the slabs. In this embodiment the amplifier is optically pumped with pump light 108 and 110.

Figure 9:
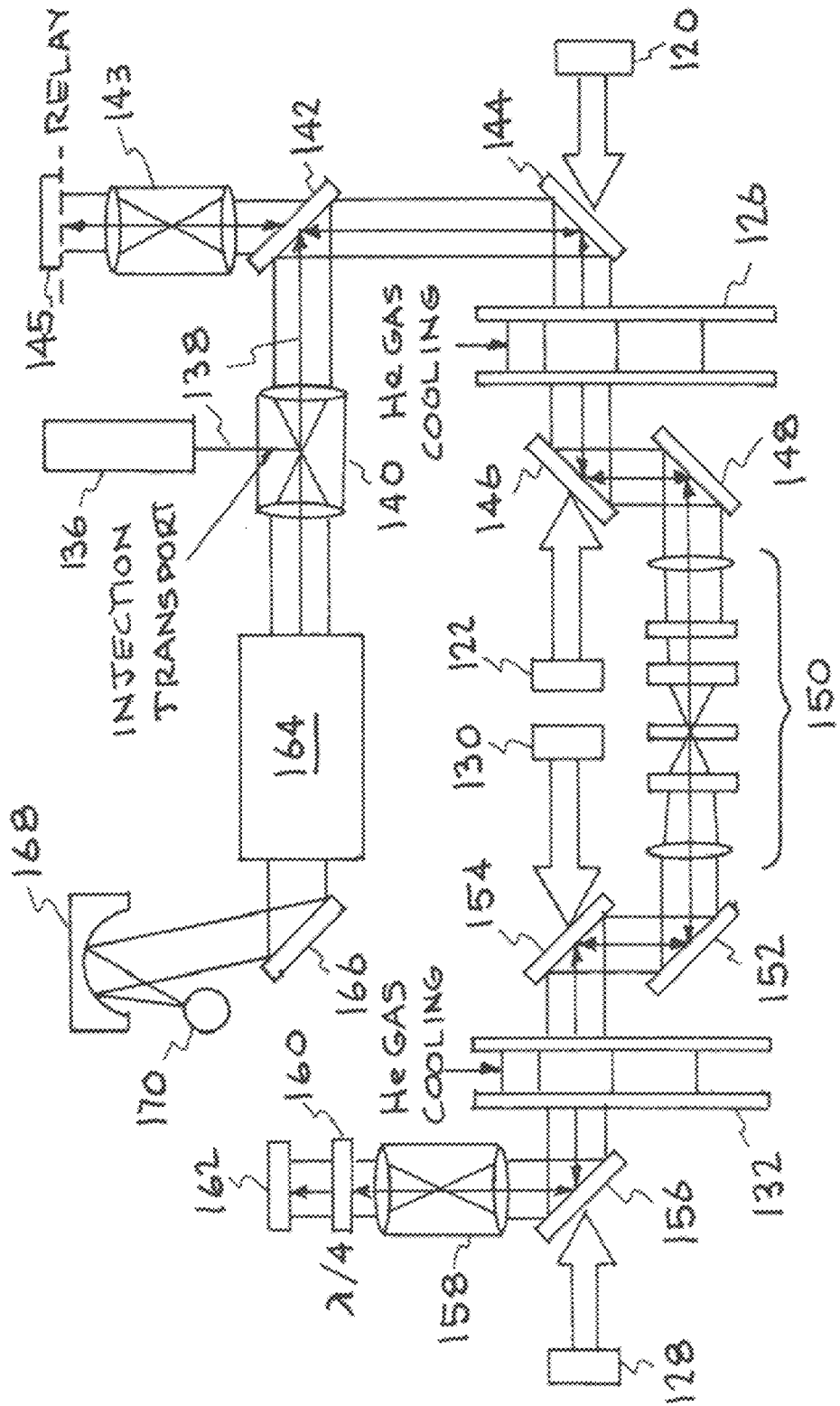
FIG. 9 shows the implementation of two gas-cooled amplifiers in a system.

FIG. 9 shows the implementation of two gas-cooled amplifiers in a system. In this system, CW diode lasers 120 and 122 optically pump gas-cooled amplifier 126. CW diode lasers 128 and 130 optically pump gas-cooled amplifier 132. A high contrast short pulse front end laser 136 provides pulses to be amplified. According to the present invention, a plurality of these pulses is provided within the fluorescence lifetime of the laser amplifiers. The series of pulses are located in beam 138 which is injected into the system at or near the focal plane of telescope 140. The beam is reflected from polarizer 142 and then from dichroic mirror 144 to pass a first time through amplifier 126. Dichroic mirrors in this system transmit diode pump light but reflect laser light. The beam is then reflected by dichroic mirror 146 and mirror 148 to pass through spatial filter 150 and then be reflected by mirror 152 and dichroic mirror 154 to make a first pass through amplifier 132 before being reflected by dichroic mirror 156 to pass through relay optics 158, a quarter wave plate 160 and then to be reflected by mirror 162 which reflects the beam back through amplifiers 132 and 126. Then, when the beam is incident on polarizer 142 for a second time, the beam is transmitted, passes through a relay telescope 143, and is incident on an adaptive-optic mirror 145, which reflects the beam back through amplifiers 126 and 132 two more times. When the beam is incident on polarizer 142 for a third time, the beam is reflected through telescope 140, passes through a high average power compressor 164. The beam is then reflected by mirror 166 and focused by concave mirror 168 onto target 170. The beam makes four amplification passes in this system.

The gain bandwidth of an amplifier making use of any anisotropic gain material for which the absorption/gain spectra are different along the various optical axes can be increased by utilizing the gain along multiple crystal axes. This may be accomplished by polarization multiplexing the beam on multiple passes through the gain material, polarization encoding the spectrum of the beam, or simply mounting several crystals at different orientations while extracting with one polarization state. In combining these multi-axis schemes with the diode-pumped gas-cooled-slab architecture (illustrated in FIG. 8 and FIG. 9), the order in which the slabs are placed in the amplifier head can help balance the distribution of deposited pump power among the slain, with benefits of efficiency and material characteristics.

Figure 10A:
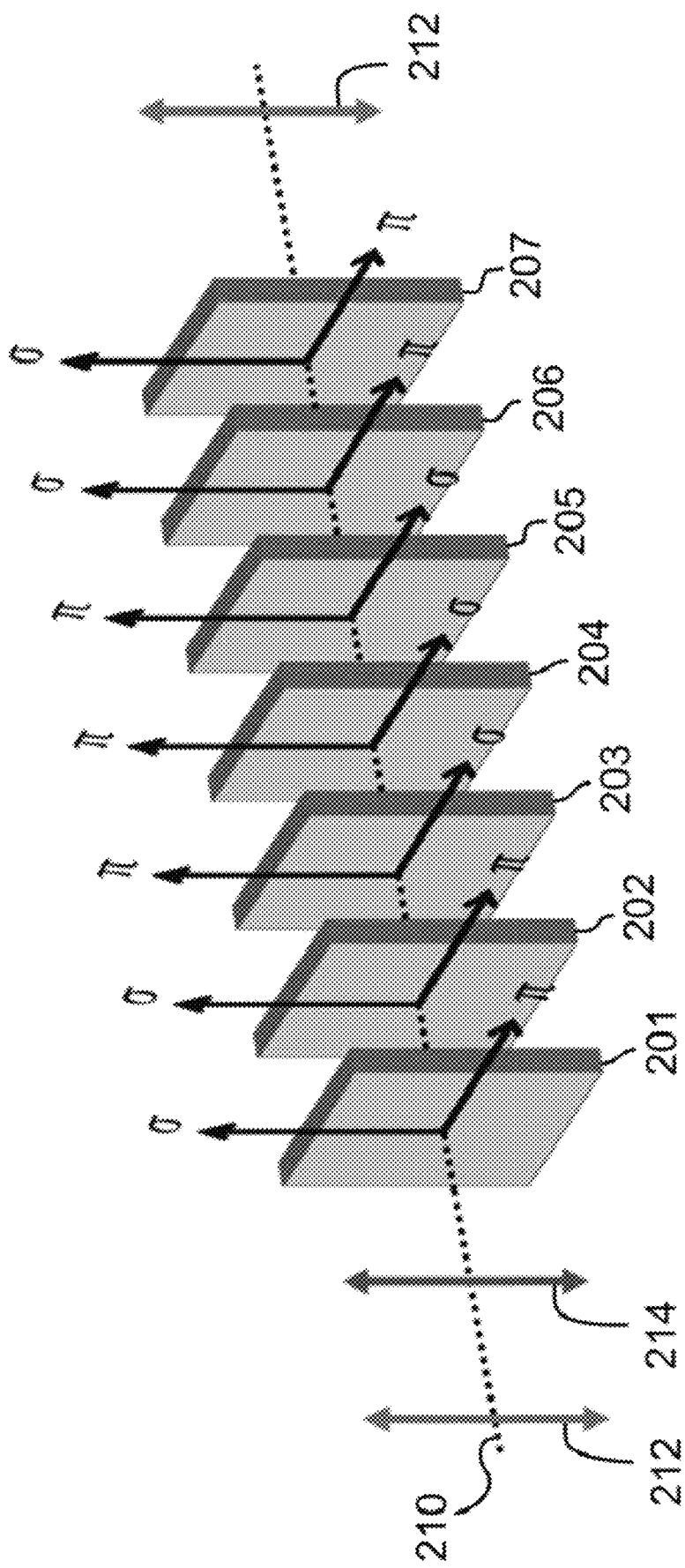
FIG. 10A illustrates combining anisotropic material and an end-pumped multi-slab amplifier to achieve significant improvement to both the gain spectrum and pump absorption by rotating a fraction of the slabs with respect to the laser polarization axis.
Figure 10B:
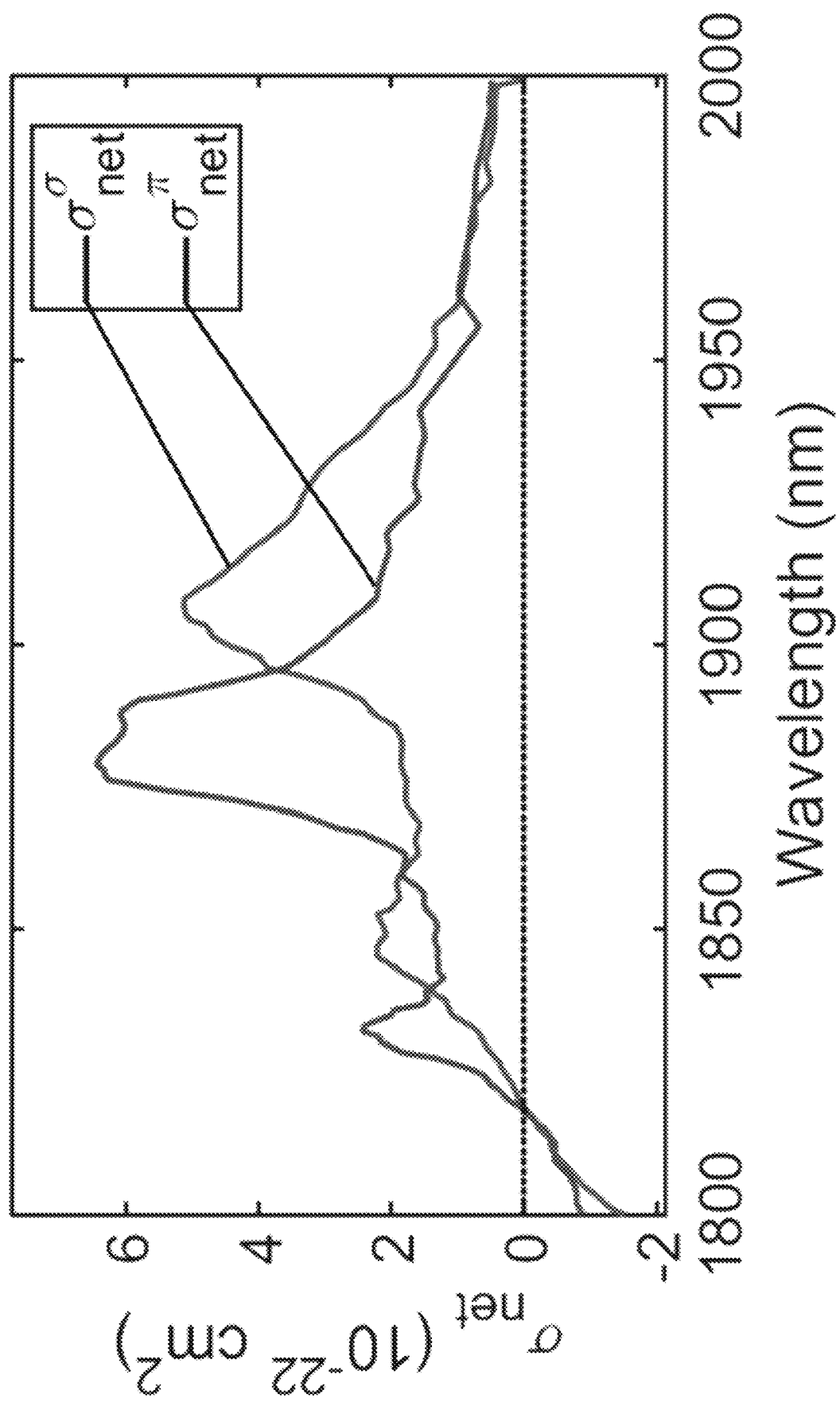
FIG. 10B shows the net gain spectrum of Tm:YLF with 30% of the population in the $^3F_4$ state for both σ and π polarizations.
Figure 10C:
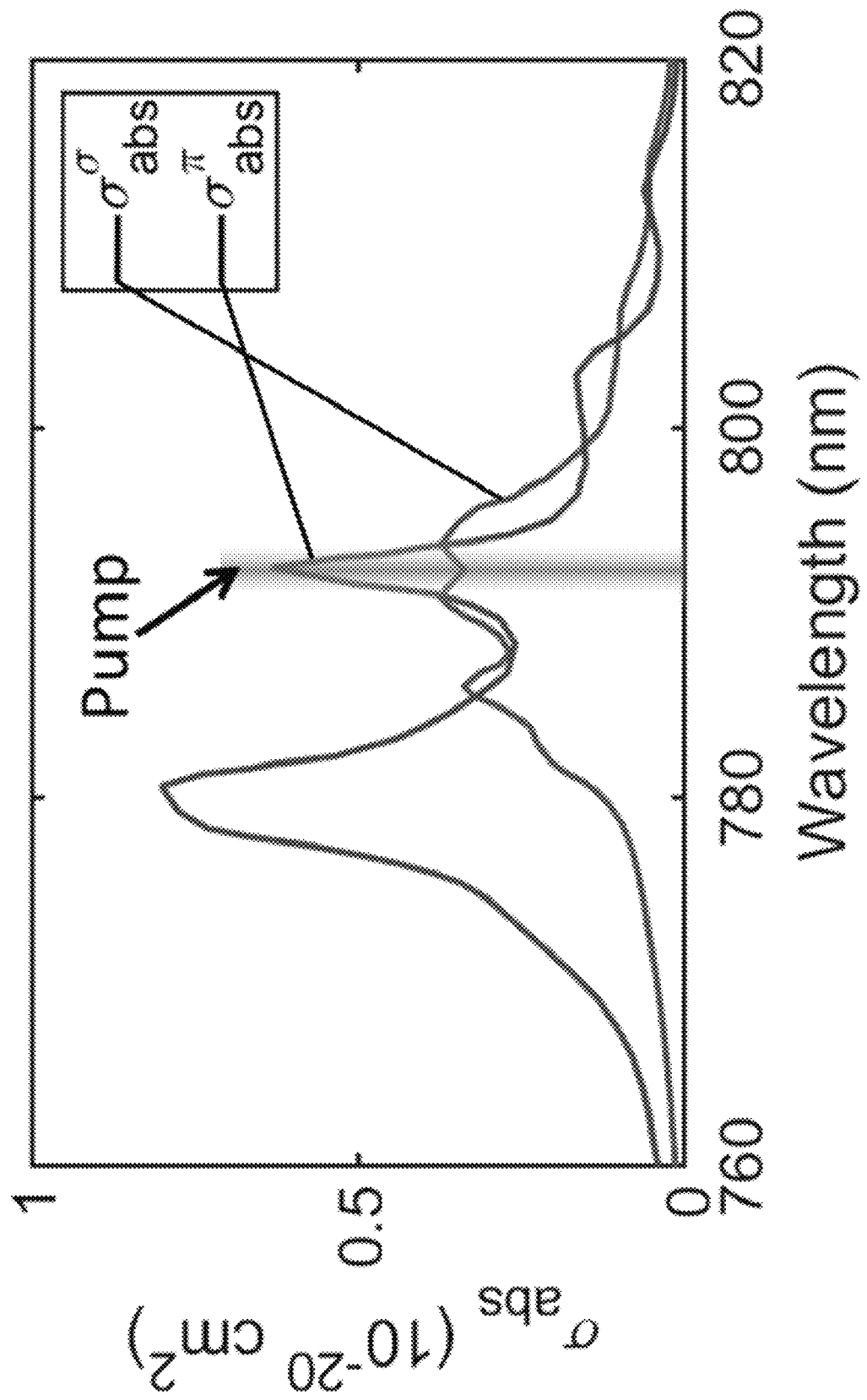
FIG. 10C shows the absorption spectra of Tm:YLF for both σ and π polarizations.
Figure 11A:
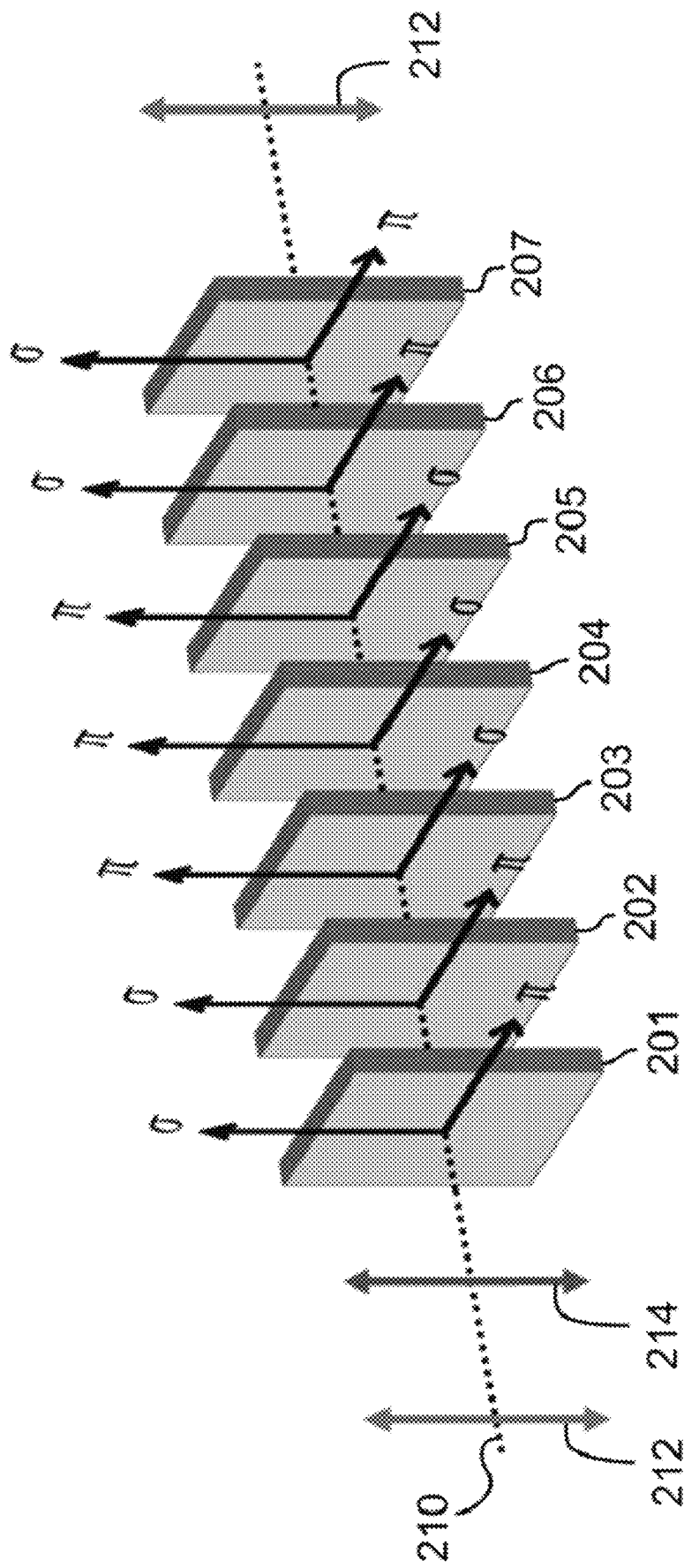
FIG. 11A illustrates a pumping scheme in which Tm:YLF is pumped at 793 nm.
Figure 11B:
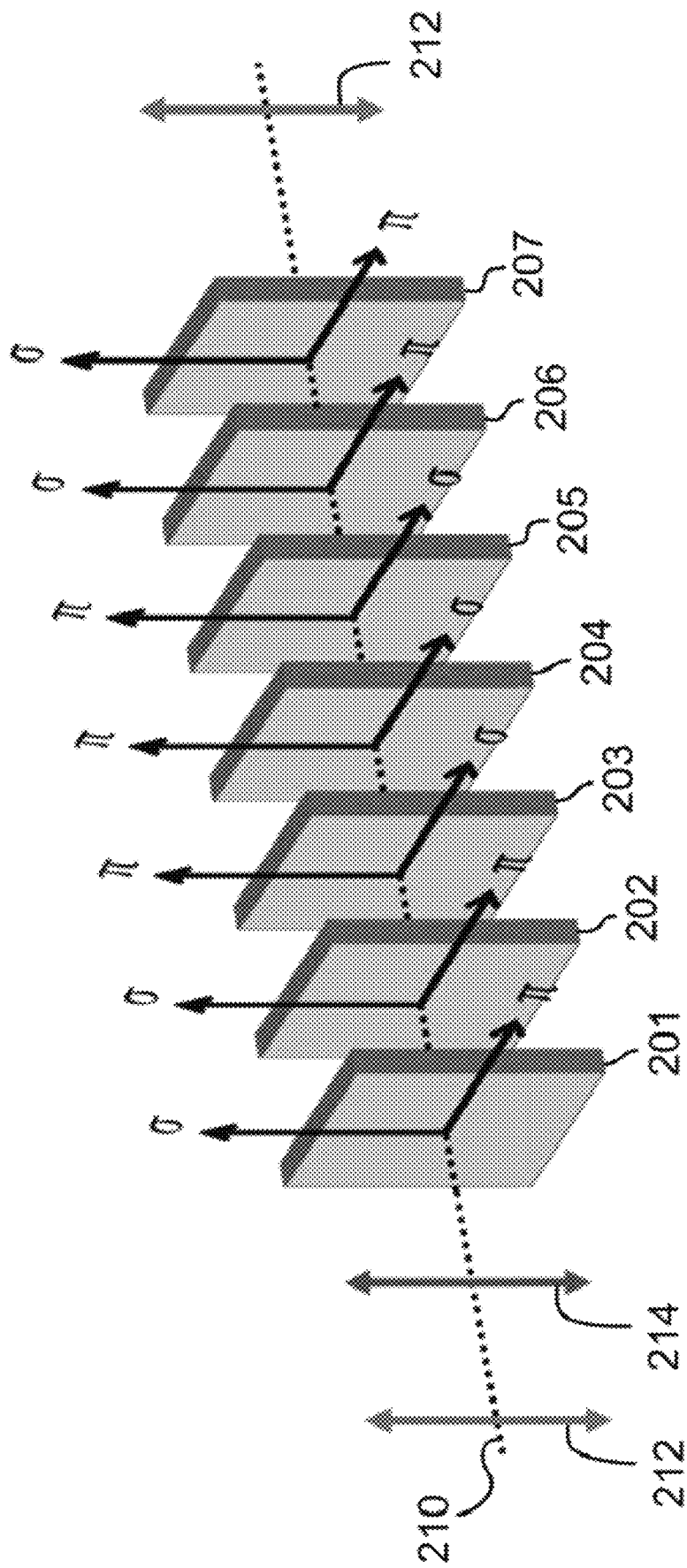
FIG. 11B providers a configuration where the pump light comprises two wavelengths.
Figure 11C:
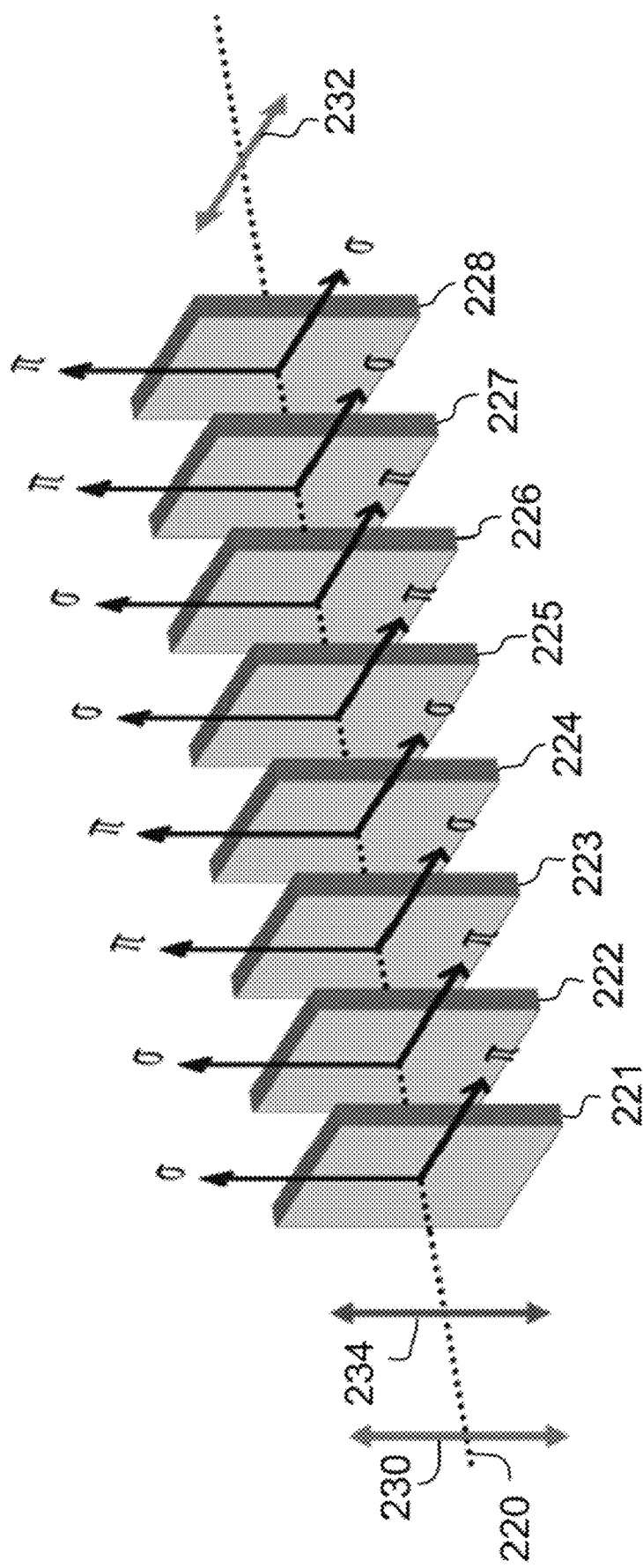
FIG. 11C shows a variation in which a cassette of slabs are pumped on each end with different polarizations.

The implementation of FIG. 10A places slabs 201-207 on optical axis 210. Here the center slabs 203-205 are rotated 90 degrees with respect to the outer slabs and the end-pumped laser polarizations 212 and extracting laser polarizations 214 are shown using arrows. The benefit of this technique is illustrated for the specific case of Tm:YLF gain material in FIG. 10B, which shows the net gain spectrum of Tm:YLF for both σ and π axes with 30% of the population in the $^3F_4$ state. The total gain achieved using both gain material axes yields a combined gain spectrum that is significantly broader than what could be achieved with one gain material orientation alone. FIG. 10C shows the absorption spectra of Tm:YLF for both polarizations. The orientation of the slabs in the cassette takes advantage of the lower absorption along the σ axis in the outer slabs and higher absorption along the π axis in the inner slabs to help balance the deposition of pump power. The need for this technique arises from the fact that in the end-pumped cassette architecture, pump light must travel through one gain element to reach another. Thus, the deposition of pump power in the inner slabs depends on the absorption in the outer slabs. Several examples of implementations of this method are illustrated in FIGS. 11A-C using examples relevant for Tm:YLF to illustrate the benefits. Based on the teachings of this disclosure, those skilled in the art will understand that other materials are usable. This method is applicable to any anisotropic laser gain medium.

FIG. 11A, which is identical to FIG. 10A, illustrates a pumping scheme in which Tm:YLF is pumped at 793 nm. At this wavelength pump light is more strongly absorbed on the π-axis than on its σ-axis. With the slabs in the orientation illustrated, the lower pump light received by the innermost slabs is compensated orienting them so that they absorb pump light more strongly.

FIG. 11B, which is identical in configuration to FIGS. 10A and 11A, except that the pump light 212 comprises two wavelengths. In the Tm:YLF case, the cassette could be pumped at both $\lambda_1=780$ and $\lambda_2=793$ nm. With the orientation illustrated, the 793 nm light would be efficiently absorbed in the outermost slabs while the 780 nm light would pass through the outer slabs and pump the inner slabs.

FIG. 11C shows a variation in which a cassette of slabs 221-228, located on optical axis 220, are pumped on each by with a different polarization 230 and 232 to obtain extraction polarization 234.

Based on this disclosure, the above techniques could use all three axes of a biaxial material. Different axes of distinct gain materials can also be used. Further, any combination of the aforementioned techniques may be used together.

The most efficient choice of pump polarization, pump center wavelength(s), how many slabs to rotate, and the orientations of the slabs depend on many factors. These include the polarization extraction scheme (linear, polarization multiplexed, or polarization-encoded), the pump bandwidth, the shapes of the absorption/emission spectra, and the efficiencies of the anti-reflection coatings, among other factors. The efficiency as a function of these parameters cannot be expressed in a simple, closed form expression. Instead, the designer must create designs with various combinations of parameters to determine the optimal design point.

The primary benefit of the crystal rotating technique is that it allows the laser designer to minimize crystal doping. For all gain materials, reducing doping tends to improve material properties, such as thermal conductivity and (generally undesirable) non-radiative quenching. In the case of quasi-3-level gain materials, minimizing the required doping also minimizes the pump power, as less pump light is needed to pump the system to transparency. In the special case of materials where cross-relaxation is part of the pumping process (Tm-doped materials are an example), this method can lower the doping in the center slabs, while keeping the doping high enough in the outermost slabs for efficient cross-relaxation.

Concepts

This writing also presents at least the following concepts:

1. A method, comprising:

providing a gas cooled solid-state laser gain medium;

continuously optically pumping said gain medium for a period of time to produce excited state ions; and producing amplified pulses by directing a plurality of pulses to be amplified through said gain medium within the fluorescence decay time of said laser gain medium.

2. The method of concepts 1 and 3-11, wherein said gain medium comprises at least one slab.

3. The method of concepts 1, 2 and 4-11, wherein said gain medium comprises a fluorescence lifetime that is sufficiently long that at least 10% of the stored energy that remains in the gain medium after any one pulse carries over to the next pulse of said plurality of pulses.

4. The method of concepts 1-3 and 5-11, wherein said gain medium comprises a saturation fluence that is high enough to make it impossible to achieve at least a 20% extraction efficiency without operating at a fluence above the lowest damage threshold of said plurality of optics when only one pulse is propagated through the amplifiers during the fluorescence decay time of the laser gain medium.

5. The method of concepts 1-4 and 6-11, wherein the operating fluence of said gain medium is lower than the damage fluence, even when the saturation fluence is greater than the damage fluence.

6. The method of concepts 1-5 and 7-11, further comprising a plurality of optics positioned to received said amplified pulses, wherein said gain medium comprises a gain spectra that is sufficiently broad such that said amplified pulses can be optically compressed to sub-ps duration and wherein said gain medium comprises a saturation fluence that is high enough to make it impossible to achieve at least a 20% extraction efficiency without operating at a fluence above the lowest damage threshold of said plurality of optics, when only one pulse is propagated through the amplifiers during the fluorescence decay time of the laser gain medium.

7. The method of concepts 1-6 and 8-11, wherein the step of continuously optically pumping said gain medium is carried out with at least one laser diode.

8. The method of concepts 1-7, 9 and 11, wherein the extraction efficiency for any one pulse is no more than a few percent and the stored energy extracted by the train of pulses is greater than the energy that is lost to fluorescence decay.

9. The method of concepts 1-8 and 11, wherein said gain medium comprises a plurality of gas-cooled slabs.

10. The method of concepts 1-9 and 11, wherein said gain medium comprises at least one rare-earth dopant.

11. The method of concepts 1-10, wherein said gain medium comprises slabs of at least one anisotropic gain material mounted so that two or more optical axes of said slabs interact with the amplified pulses to increase the gain bandwidth and wherein the order in which said slabs are rotated is selected to minimize the required doping of said gain medium and/or to minimize the pump power required in the step of continuously optically pumping said gain medium.

12. An apparatus, comprising:
a gas cooled solid-state laser gain medium;
means for continuously optically pumping said gain medium for a period of time to produce excited state ions; and
means for producing amplified pulses by directing a plurality of pulses to be amplified through said gain medium within the fluorescence decay time of said laser gain medium.

13. The apparatus of concepts 12 and 14-22, wherein said gain medium comprises at least one slab.

14. The apparatus of concepts 12, 13 and 15-22, wherein said gain medium comprises a fluorescence lifetime that is sufficiently long that at least 10% of the stored energy that remains in the gain medium after any one pulse carries over to the next pulse of said plurality of pulses.

15. The apparatus of concepts 12-14 and 16-22, wherein said gain medium comprises a saturation fluence that is high enough to make it impossible to achieve at least a 20% extraction efficiency without operating at a fluence above the lowest damage threshold of said plurality of optics when only one pulse is propagated through the amplifiers during the fluorescence decay time of the laser gain medium.

16. The apparatus of concepts 12-15 and 17-22, wherein the operating fluence of said gain medium is lower than the damage fluence, even when the saturation fluence is greater than the damage fluence.

17. The apparatus of concepts 12-16 and 18-22, further comprising a plurality of optics positioned to received said amplified pulses, wherein said gain medium comprises a gain spectra that is sufficiently broad such that said amplified pulses comprise sub-ps pulses and wherein said gain medium comprises a saturation fluence that is high enough to make it impossible to achieve at least a 20% extraction efficiency without operating at a fluence above the lowest damage threshold of said plurality of optics, when only one pulse is propagated through the amplifiers during the fluorescence decay time of the laser gain medium.

18. The apparatus of concepts 12-17 and 19-22, wherein the step of continuously optically pumping said gain medium is carried out with at least one laser diode.

19. The apparatus of concepts 12-18, 20-22, wherein the extraction efficiency for any one pulse is no more than a few percent and the stored energy extracted by the train of pulses is greater than the energy that is lost to fluorescence decay.

20. The apparatus of concepts 12-19, 21 and 22, wherein said gain medium comprises a plurality of gas-cooled slabs.

21. The apparatus of concepts 12-20 and 22, wherein said gain medium comprises at least one rare-earth dopant.

22. The apparatus of concepts 12-21, wherein said gain medium comprises slabs of at least one anisotropic gain material mounted so that two or more optical axes of said slabs interact with the amplified pulses to increase the gain bandwidth and wherein the order in which said slabs are rotated is selected to minimize the required doping of said gain medium and/or to minimize the pump power required in when said gain medium is continuously optically pumped.

The foregoing description of the invention has been presented for purposes of illustration and description and is not intended to be exhaustive or to limit the invention to the precise form disclosed. Many modifications and variations are possible in fight of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. A method, comprising:
providing a gas cooled solid-state laser gain medium;
continuously optically pumping said gain medium for a period of time to produce excited state ions; and
producing amplified pulses by directing a plurality of pulses to be amplified through said gain medium;
wherein said laser gain medium has a fluorescence decay time; and
wherein the plurality of pulses to be amplified are directed through said laser gain medium in less time than the fluorescence decay time of said laser gain medium.

2. The method of claim 1, wherein said gain medium comprises at least one slab.

3. The method of claim 1, wherein said gain medium has fluorescence lifetime that is sufficiently long that at least 10% of the stored energy that remains in the gain medium after any one amplified pulse of the amplified pulses carries over to the next amplified pulse of the amplified pulses.

4. The method of claim 1, further comprising:
a plurality of optics positioned to receive said plurality of pulses to be amplified;
wherein said gain medium has a saturation fluence that is high enough to make it impossible to achieve at least a 20% extraction efficiency without operating at a fluence above the lowest damage threshold of said plurality of optics when only one pulse is propagated through the plurality of optics during the fluorescence decay time of the laser gain medium.

5. The method of claim 1, wherein the operating fluence of said gain medium is lower than its damage fluence, even when its saturation fluence is greater than the damage fluence.

6. The method of claim 1, further comprising a plurality of optics positioned to receive said plurality of pulses to be amplified, wherein said gain medium comprises a gain spectra that is sufficiently broad such that said amplified pulses can be optically compressed to sub-ps duration and wherein said gain medium comprises a saturation fluence that is high enough to make it impossible to achieve at least a 20% extraction efficiency without operating at a fluence above the lowest damage threshold of said plurality of optics, when only one pulse is propagated through the plurality of optics during the fluorescence decay time of the laser gain medium.

7. The method of claim 1, wherein the step of continuously optically pumping said gain medium is carried out with at least one laser diode.

8. The method of claim 1, wherein the extraction efficiency for any one amplified pulse of the amplified pulses is no more than a few percent and the stored energy extracted by the amplified pulses is greater than the energy lost due to fluorescence decay.

9. The method of claim 1, wherein said gain medium comprises a plurality of gas-cooled slabs.

10. The method of claim 1, wherein said gain medium comprises at least one rare-earth dopant.

11. The method of claim 1, wherein said gain medium comprises slabs of at least one anisotropic gain material mounted so that two or more optical axes of said slabs interact with the amplified pulses to increase the gain bandwidth and wherein the order in which said slabs are mounted is selected to minimize the required doping of said gain medium and/or to minimize the pump power required in the step of continuously optically pumping said gain medium.

12. An apparatus, comprising:
a gas cooled solid-state laser gain medium;
means for continuously optically pumping said gain medium for a period of time to produce excited state ions; and
means for producing amplified pulses by directing a plurality of pulses to be amplified through said gain medium;
wherein the laser gain medium has a fluorescence decay time; and
wherein the apparatus is configured to direct the plurality of pulses to be amplified through said laser gain medium in less time than the fluorescence decay time of the laser gain medium.

13. The apparatus of claim 12, wherein said gain medium comprises at least one slab.

14. The apparatus of claim 12, wherein said gain medium has a fluorescence lifetime that is sufficiently long that at least 10% of the stored energy that remains in the gain medium after any one amplified pulse of the amplified pulses carries over to the next amplified pulse of the amplified pulses.

15. The apparatus of claim 12, further comprising:
a plurality of optics positioned to receive said plurality of pulses to be amplified;
wherein said gain medium has a saturation fluence that is high enough to make it impossible to achieve at least a 20% extraction efficiency without operating at a fluence above the lowest damage threshold of said plurality of optics when only one pulse is propagated through the plurality of optics during the fluorescence decay time of the laser gain medium.

16. The apparatus of claim 12, wherein the operating fluence of said gain medium is lower than its damage fluence, even when its saturation fluence is greater than the damage fluence.

17. The apparatus of claim 12, further comprising a plurality of optics positioned to receive said plurality of pulses to be amplified, wherein said gain medium comprises a gain spectra that is sufficiently broad such that said amplified pulses comprise sub-ps pulses and wherein said gain medium comprises a saturation fluence that is high enough to make it impossible to achieve at least a 20% extraction efficiency without operating at a fluence above the lowest damage threshold of said plurality of optics, when only one pulse is propagated through the plurality of optics during the fluorescence decay time of the laser gain medium.

18. The apparatus of claim 12, wherein the step of continuously optically pumping said gain medium is carried out with at least one laser diode.

19. The apparatus of claim 12, wherein the extraction efficiency for any one amplified pulse of the amplified pulses is no more than a few percent and the stored energy extracted by the amplified pulses is greater than the energy lost due to fluorescence decay.

20. The apparatus of claim 12, wherein said gain medium comprises a plurality of gas-cooled slabs.

21. The apparatus of claim 12, wherein said gain medium comprises at least one rare-earth dopant.

22. The apparatus of claim 12, wherein said gain medium comprises slabs of at least one anisotropic gain material mounted so that two or more optical axes of said slabs interact with the amplified pulses to increase the gain bandwidth and wherein the order in which said slabs are mounted is selected to minimize the required doping of said gain medium and/or to minimize the pump power required in when said gain medium is continuously optically pumped.

* * * * *